United States Patent
Kilgore et al.

(10) Patent No.: US 12,491,990 B2
(45) Date of Patent: Dec. 9, 2025

(54) FLY-BY-WIRE SYSTEM WITH FCC-INTEGRATED SERVO ACTUATORS

(71) Applicant: Garmin International, Inc., Olathe, KS (US)

(72) Inventors: Dustin B. Kilgore, Olathe, KS (US); Benjamin N. Patel, Olathe, KS (US); Perry L. Dinger, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 18/612,462

(22) Filed: Mar. 21, 2024

(65) Prior Publication Data

US 2024/0228023 A1  Jul. 11, 2024

Related U.S. Application Data

(63) Continuation-in-part of application No. 18/232,173, filed on Aug. 9, 2023, now Pat. No. 12,240,591.

(51) Int. Cl.
*B64C 13/50* (2006.01)
*B64C 13/04* (2006.01)

(52) U.S. Cl.
CPC .......... *B64C 13/503* (2013.01); *B64C 13/044* (2018.01)

(58) Field of Classification Search
CPC . B64C 13/503; B64C 13/044; B64C 13/0421; B64C 13/0423; B64C 13/505
See application file for complete search history.

(56) References Cited

U.S. PATENT DOCUMENTS

| | | | |
|---|---|---|---|
| 3,565,006 A | 2/1971 | Stewart | |
| 4,449,442 A * | 5/1984 | Ebbing | F15B 13/16 91/44 |
| 8,230,750 B2 | 7/2012 | Flatt et al. | |
| 8,794,865 B2 | 8/2014 | Stadler | |
| 2003/0127569 A1 | 7/2003 | Bacon et al. | |
| 2006/0048602 A1 | 3/2006 | Biester | |
| 2006/0113933 A1 | 6/2006 | Blanding et al. | |
| 2007/0083301 A1* | 4/2007 | Yeh | B64C 13/503 244/175 |
| 2010/0029428 A1 | 2/2010 | Abe et al. | |
| 2011/0118906 A1* | 5/2011 | Fervel | B64C 13/503 701/3 |
| 2016/0103295 A1 | 4/2016 | Zhang et al. | |
| 2019/0016443 A1* | 1/2019 | Alfred | B64C 13/503 |
| 2020/0164965 A1* | 5/2020 | Fervel | B64C 13/503 |

(Continued)

*Primary Examiner* — Rodney A Bonnette
(74) *Attorney, Agent, or Firm* — Samuel M. Korte; Max M. Ali; Kathleen D. Fitterling

(57) ABSTRACT

A fly-by-wire (FBW) system comprising a plurality of servo actuators for controlling the flight control surfaces of an aircraft in which each of the servo actuators may comprise a flight control computer (FCC) that controls the output of the servo actuator. Input from a pilot or autopilot system may be communicated directly to the servo actuator FCCs, which may perform the requisite computations to determine the servo actuator output. For each axis, a primary and a secondary servo actuator may be provided, and the secondary servo actuator may operate in the event of a failure in the primary servo actuator. Each servo actuator may have two motors, each configured to drive an end of a differential such that each motor can act as a brake, a clutch or motor on the servo actuator.

14 Claims, 22 Drawing Sheets

(56) References Cited

U.S. PATENT DOCUMENTS

2022/0219810 A1* 7/2022 Harrell .................. G05D 1/101
2022/0325764 A1 10/2022 Manzanares et al.
2023/0382517 A1 11/2023 Dinger

* cited by examiner

FLY-BY-WIRE SYSTEM WITH FCC-INTEGRATED SERVO ACTUATORS

CROSS-REFERENCE TO RELATED APPLICATIONS

This non-provisional patent application is a continuation-in-part and claims prior benefit, with regard to all common subject matter, of earlier-filed U.S. patent application Ser. No. 18/232,173 ("the '173 Application"), filed Aug. 9, 2023, and entitled "FLY-BY-WIRE SERVO ACTUATOR FOR PRIMARY FLIGHT CONTROL." The identified '173 non-provisional patent application is hereby incorporated by reference in its entirety into the present application.

FIELD

Embodiments of the present disclosure are generally directed to servo actuators. More specifically, embodiments of the present disclosure are directed to fly-by-wire (FBW) servo actuators for primary flight control for aircraft, including servo actuators with integrated flight control computers (FCCs).

BACKGROUND

Servo actuators are often used for position control in a variety of electro-mechanical systems. For example, servo actuators may be used to control the motion of vehicles such as aircraft, spacecraft, watercraft, and other vehicles. The servo actuators may be a part of a motion control system for a vehicle that controls the motion of the vehicle without continuous input. For example, in an aircraft, servo actuators may control the position of control surfaces (e.g., ailerons, elevators, rudders, etc.) to maintain the position of the aircraft based on a discrete input without requiring an operator to apply constant input.

For flight control in an aircraft, two servo actuators are often used to provide redundancy in case of failure. The two servo actuators work in tandem and communicate with one another to correctly actuate the control surface. The actuators are typically hydraulic or linear using a ball or lead screw. The two servo actuators are typically housed in separate housings, which may increase latency in the communications. Furthermore, in FBW systems, a latency increase is seen when communicating to separate servo actuators.

Fly-by-wire systems convert pilot input via a flight control device (e.g., yoke, sidestick, rudder pedal, etc.) into electronic signals that are communicated to a flight control computer. The flight control computer determines, based on control laws, how a servo actuator should be moved to adjust the control surfaces. The flight control computer is generally centrally located, such as in the avionics bay, and communicates the output to the servo actuators located at the control surfaces. The servo actuators are typically configured with a processor operable to interpret the signal from the FCC and to operate the servo actuator based on the received control signal.

SUMMARY

Embodiments of the present disclosure are generally directed to a servo actuator for actuating control surfaces on a vehicle, such as for primary flight control in FBW aircraft. The servo actuator may provide rotary output to an output arm to actuate a control surface. The servo actuator may comprise two differentials, and each differential may comprise two distinct inputs powered by distinct motors such that the servo actuator comprises four motors total. Thus, failure in one of the four motors may be compensated by the remaining three motors. The differentials may comprise harmonic gears (also known as strain wave gears) in which a circular spline is driven by a first gear coupled to a motor, a wave generator is driven by a second gear coupled to a motor or by a direct drive motor, and a flex spline is the differential output. The flex spline may drive an output shaft coupled to the output arm for actuation of the control surface.

A fly-by-wire control system comprising FBW servo actuators having integrated FCCs is also disclosed. Pilot input (e.g., via a sidestick) may be communicated directly to the servo actuators, and the integrated FCCs may perform the control law calculations to instruct the operation of the servo actuator based on the pilot input. The integration of the FCC into the servo actuators may improve system redundancy, which leads to an improvement in safety. Integrating the FCCs may also improve response time for the servo actuators, as the data transfer time from the primary FCC to the servo actuators can be eliminated.

In some embodiments, the techniques described herein relate to a fly-by-wire servo actuator for an aircraft, including: a first outer shaft and a second outer shaft; an inner output shaft received within the first outer shaft and the second outer shaft and configured to be drive by the first outer shaft and the second outer shaft; an output arm coupled to the inner output shaft, the output arm configured to actuate a control surface of the aircraft; a first differential configured to drive the first outer shaft, the first differential including: a first harmonic gear including a first wave generator, a first flex spline coupled to the first outer shaft, and a first circular spline; a first outer gear coupled to the first circular spline and driven by a first motor to drive the first circular spline; and a first inner gear coupled to the first wave generator and driven by a second motor to drive the first wave generator; and a second differential configured to drive the second outer shaft, the second differential including: a second harmonic gear including a second wave generator, a second flex spline coupled to the second outer shaft, and a second circular spline; a second outer gear coupled to the second circular spline and driven by a third motor to drive the second circular spline; and a second inner gear coupled to the second wave generator and driven by a fourth motor to drive the second wave generator.

In some embodiments, the techniques described herein relate to a fly-by-wire servo actuator, wherein the first outer shaft is coupled to the first differential and the second outer shaft is coupled to the second differential such that the first differential and the second differential are mechanically linked, and a first speed of the first differential is equal to a second speed of the second differential.

In some embodiments, the techniques described herein relate to a fly-by-wire servo actuator, wherein a first combined motor speed of the first motor and the second motor is equal to a second combined motor speed of the third motor and the fourth motor.

In some embodiments, the techniques described herein relate to a fly-by-wire servo actuator, wherein the first motor is configured to adjust a speed thereof in response to a failure in the second motor.

In some embodiments, the techniques described herein relate to a fly-by-wire servo actuator, wherein the third motor is configured to adjust a speed thereof in response to a failure in the fourth motor.

In some embodiments, the techniques described herein relate to a fly-by-wire servo actuator, wherein the output arm is a first output arm, and wherein the fly-by-wire servo actuator further include a second output arm coupled to the inner output shaft and configured to actuate the control surface of the aircraft.

In some embodiments, the techniques described herein relate to a fly-by-wire system, including: an input system for receiving input from a pilot; and a control system communicatively coupled to the input system, the control system including: a pitch axis control including a primary pitch servo actuator and a secondary pitch servo actuator; and a roll axis control including a primary roll servo actuator and a secondary roll servo actuator, wherein each of the primary pitch servo actuator, the secondary pitch servo actuator, the primary roll servo actuator, and the secondary roll servo actuator include a flight control computer (FCC) configured to control a respective servo actuator based on the input from the input system and feedback from a corresponding control surface.

In some embodiments, the techniques described herein relate to a control system for aircraft, including: an input system, including: at least one flight control device including at least one sensor configured to provide a pitch axis command and a roll axis command based on a first input received from a pilot; a rudder pedal interface including at least one yaw axis sensor for providing a desired yaw axis command based on a second input received from the pilot; a pitch servo actuator including a pitch axis flight control computer (FCC) configured to: receive first positional data from the at least one sensor indicative of the pitch axis command; and control the pitch servo actuator to obtain the desired pitch axis position; a roll servo actuator including a roll axis FCC configured to: receive second positional data from the at least one sensor indicative of the roll axis command; and control the roll servo actuator to obtain the desired roll axis position; and a yaw servo actuator including a yaw axis FCC configured to: receive third positional data from the at least one yaw axis sensor indicative of the yaw axis command; and control the yaw servo actuator to obtain the desired yaw axis position.

In some embodiments, the techniques described herein relate to a fly-by-wire system, including: at least one input; and a control system communicatively coupled to the at least one input, including: at least one pitch servo actuator including a pitch axis flight control computer (FCC) for adjusting an elevator based on input from the at least one input; and at least one roll servo actuator including a roll axis FCC for adjusting an aileron based on input from the at least one input; and a yaw servo actuator including a yaw axis FCC for adjusting a rudder based on input from the at least one input.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the disclosure will be apparent from the following detailed description of the embodiments and the accompanying drawing figures.

BRIEF DESCRIPTION OF THE DRAWING FIGURES

Embodiments of the disclosure are described in detail below with reference to the attached drawing figures, wherein.

Figure 1:
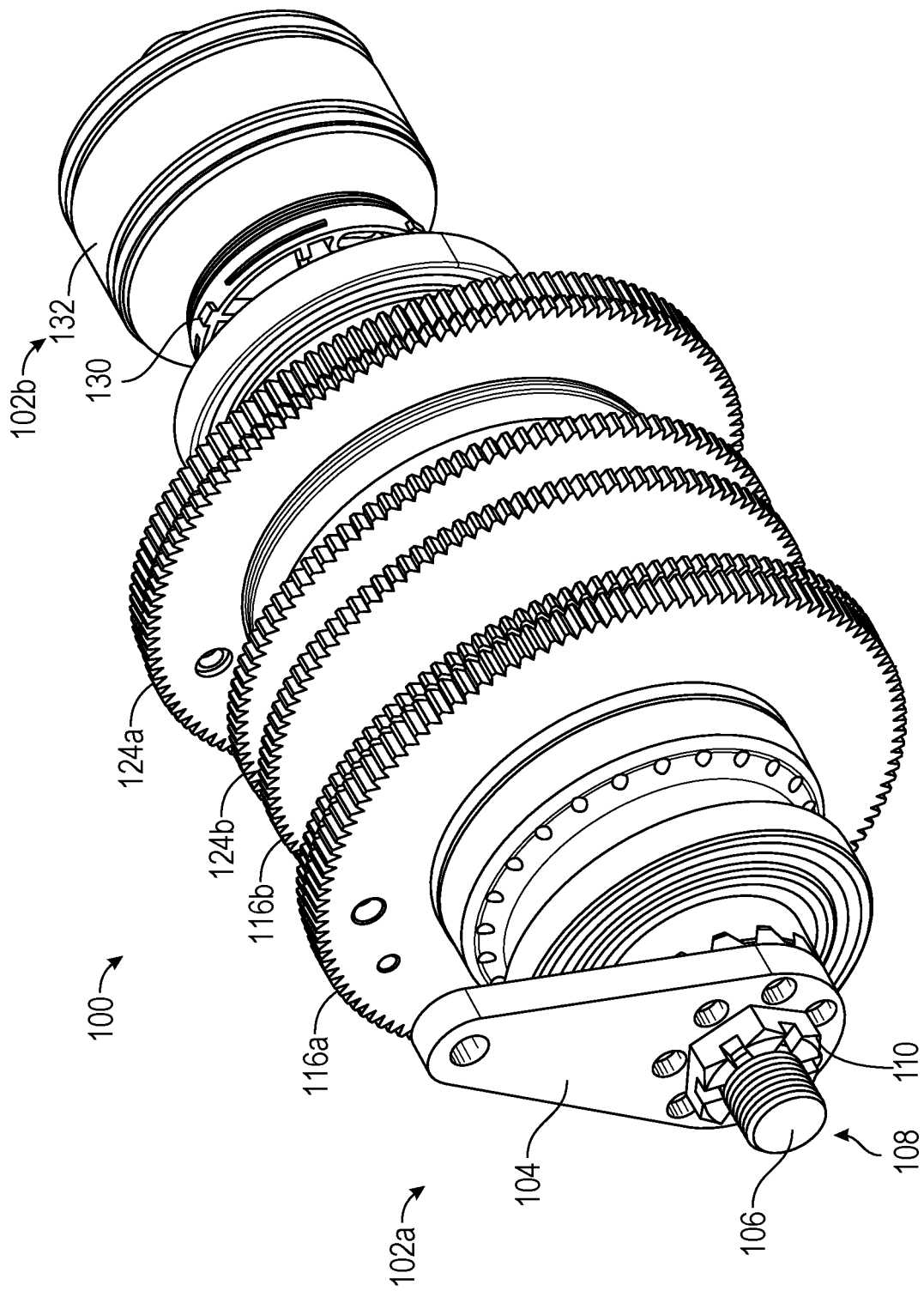
FIG. 1 depicts a drivetrain of an FBW servo actuator for some embodiments.

The drawing figures do not limit the disclosure to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the current disclosure can be practiced. The embodiments are intended to describe aspects in sufficient detail to enable those skilled in the art to practice those embodiments of the disclosure. Other embodiments can be utilized, and changes can be made without departing from the scope of the current disclosure. The following detailed description is, therefore, not to be taken in a limiting sense. The scope of the disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Generally, embodiments of the present disclosure are directed to fly-by-wire (FBW) servo actuators. FBW allows for pilot movement of flight controls to be converted into electronic signals used to control actuators to move control surfaces to a desired position based on the pilot's input. The FBW servo actuators may be used for primary flight control (e.g., control of ailerons, elevators, rudder) of aircraft. The FBW servo actuator may comprise multiple redundancies to allow for continued operation of the actuator in the event of failure of one or more components of the actuator. The failures may be due to gear locking or jamming in the drivetrain of the servo actuator and/or motor failure, for example. The multiple redundancies may allow for a single servo actuator to be used to actuate a control surface rather than requiring two servo actuators. The use of a single servo actuator may be advantageous in that all components can be contained with a single housing, which improves installation and serviceability of the actuator. Furthermore, crosstalk between actuators is eliminated.

The FBW servo actuator may comprise at least one output arm coupled to and rotationally driven by an output shaft. The at least one output arm may be coupled to a pushrod, for example, that actuates a control surface. The output shaft may be driven by a first and second differential.

The first differential may comprise a harmonic gear, a first gear, and a second gear. The first gear may be driven by a first motor and may drive a circular spline of the harmonic gear. The second gear may be driven by a second motor and may drive a wave generator of the harmonic gear. A flex spline of the harmonic gear may be coupled to an outer shaft that is in turn coupled to the output shaft to actuate the output arm. The second differential may mirror the first differential and comprise a harmonic gear with a circular spline driven by a third gear (corresponding to the first gear) that is driven by a third motor. A wave generator of the harmonic gear may be driven by a fourth gear (corresponding to the second gear) that is driven by a fourth motor. A flex spline of the harmonic gear may be coupled to a second outer shaft that is likewise coupled to the output shaft of the FBW servo actuator via a second outer shaft. In some embodiments, direct drive motors may be used in place of the second and/or fourth motors to drive the wave generators.

By connecting each differential to the output shaft via the outer shafts, the speed of the first differential and the second differential may be mechanically linked. The motor speeds may be adjusted such that the combined motor speeds of the first and second motors driving the first differential equals the combined motor speeds of the third and fourth motors driving the second differential. Thus, if the third motor fails, for example, the speed of the fourth motor can be increased to compensate for the failed motor. Accordingly, the FBW servo actuator allows for failure in gears, motors, differentials, or a combination thereof, to be compensated for by the remaining components of the actuator to ensure that flight operations are not impacted. Thus, no single point of failure exists.

Figure 2:
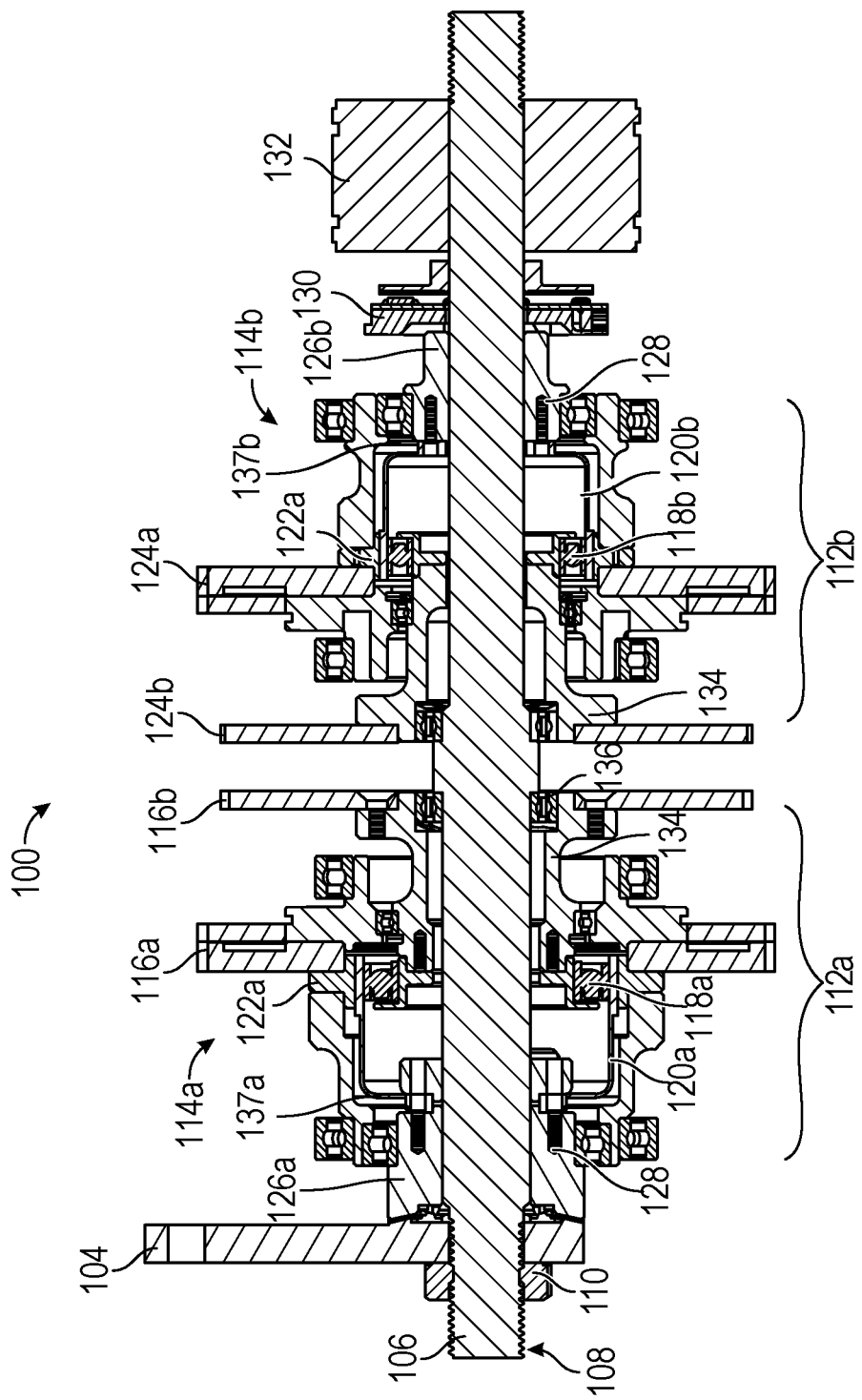
FIG. 2 depicts a cross-sectional view of the drivetrain for some embodiments.
Figure 11:
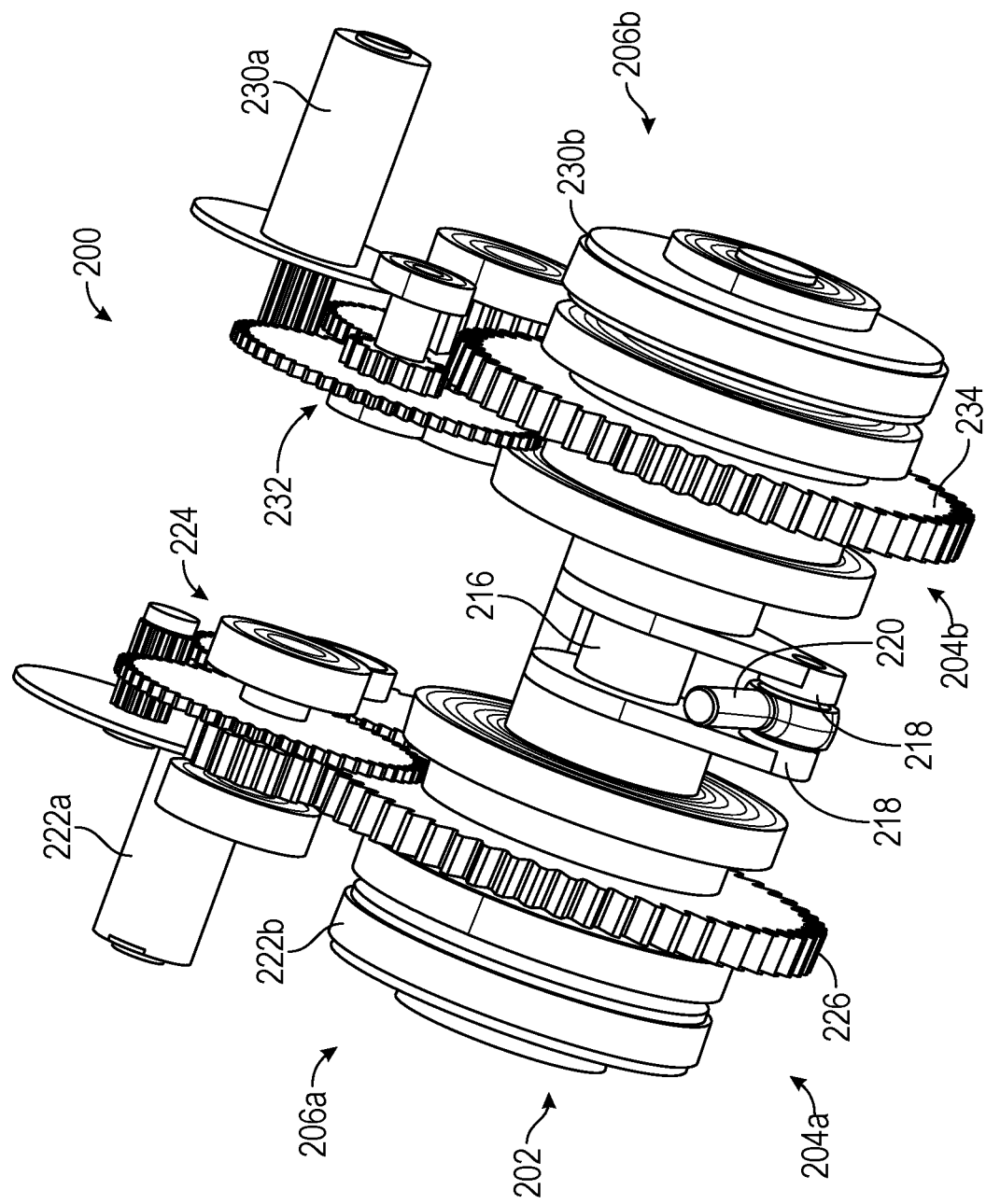
FIG. 11 depicts a drivetrain for a second FBW servo actuator for some embodiments.
Figure 12:
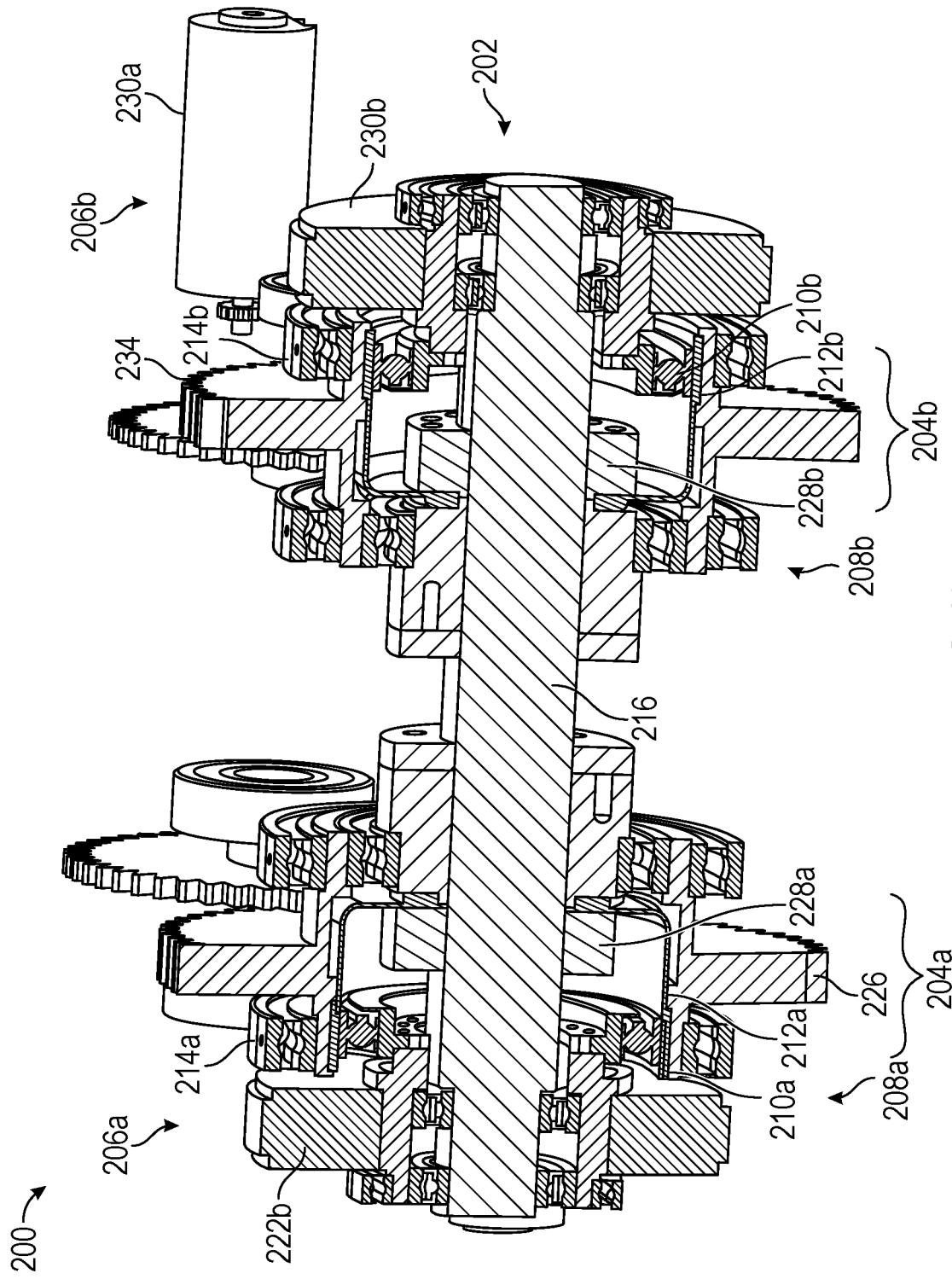
FIG. 12 depicts a cross-sectional view of the drivetrain for some embodiments.

FIGS. 1 and 2 illustrate a perspective and a cross-sectional view, respectively, of a drivetrain 100 for an FBW servo actuator for some embodiments of the present disclosure. The drivetrain 100 may comprise a front end 102a and a rear end 102b. An output arm 104 may be disposed at the front end 102a. The output arm 104 may be controlled by the drivetrain 100 via an inner output shaft 106 to thereby control movement of a pushrod or the like coupled to the output arm 104 (see FIG. 11). The output arm 104 may rotate about 106 to adjust the position of the pushrod. The pushrod, in turn, may control movement of a control surface, such as an aileron, elevator, or rudder. The shaft 106 may have a threaded end 108 for coupling to a nut 110, such as a castle nut or the like, to secure output arm 104 to shaft 106. The shaft 106 may extend from front end 102a to rear end 102b.

Drivetrain 100 may further comprise a front or first differential 112a comprising a first harmonic gear 114a, a first outer gear 116a, and a first inner gear 116b. The first harmonic gear 114a comprises a first wave generator 118a, a first flex spline 120a, and a first circular spline 122a. Rearward from first differential 112a is a rear or second differential 112b comprising a second harmonic gear 114b, a second outer gear 124a, and a second inner gear 124b. The second harmonic gear 114b likewise comprises a second wave generator 118b, a second flex spline 120b, and a second circular spline 122b. Gears 116a, 116b may be driven to drive first differential 112a, and gears 124a, 124b may be driven to drive second differential 112b. First differential 112a may be coupled to a first outer shaft 126a, and second differential 112b may be coupled to a second outer shaft 126a. As best seen in FIG. 2, shaft 106 may be received through each outer shaft 126a, 126b. Accordingly, rotational output of differentials 112a, 112b may cause corresponding rotation of the respective shafts 126a, 126b that is in turn transferred to shaft 106 to actuate output arm 104.

Each differential 112a, 112b may be coupled to a shaft 126a, 126b via one or more fasteners 128, thereby providing a fixed connection that mechanically links the rotation of outer shafts 126a, 126b to one another. In some embodiments, differentials 112a, 112b are coupled to outer shafts 126a, 126b via the flex spline 120a, 120b such that rotation of flex spline 120a, 120b causes rotation of outer shafts 126a, 126b. Accordingly, the rotational speed of differentials 112a, 112b may be equal (or near equal) even in the event of a failed component. For example, when fully operational, each differential 112a, 112b may rotate a respective outer shaft 126a, 126b at the same speed. If, for example, first differential 112a fails, second differential 112b may still be operational to drive second outer shaft 126b and, thereby, shaft 106.

Drivetrain 100 may also comprise an encoder 130 located rearward from the second outer gear 124a. The encoder 130 may be an absolute encoder. The encoder 130 may also be coupled to a resolver 132. Both the encoder 130 and the resolver 132 may be used for feedback control of drivetrain 100 and may measure angular position and/or speed of shaft 106.

Figure 3:
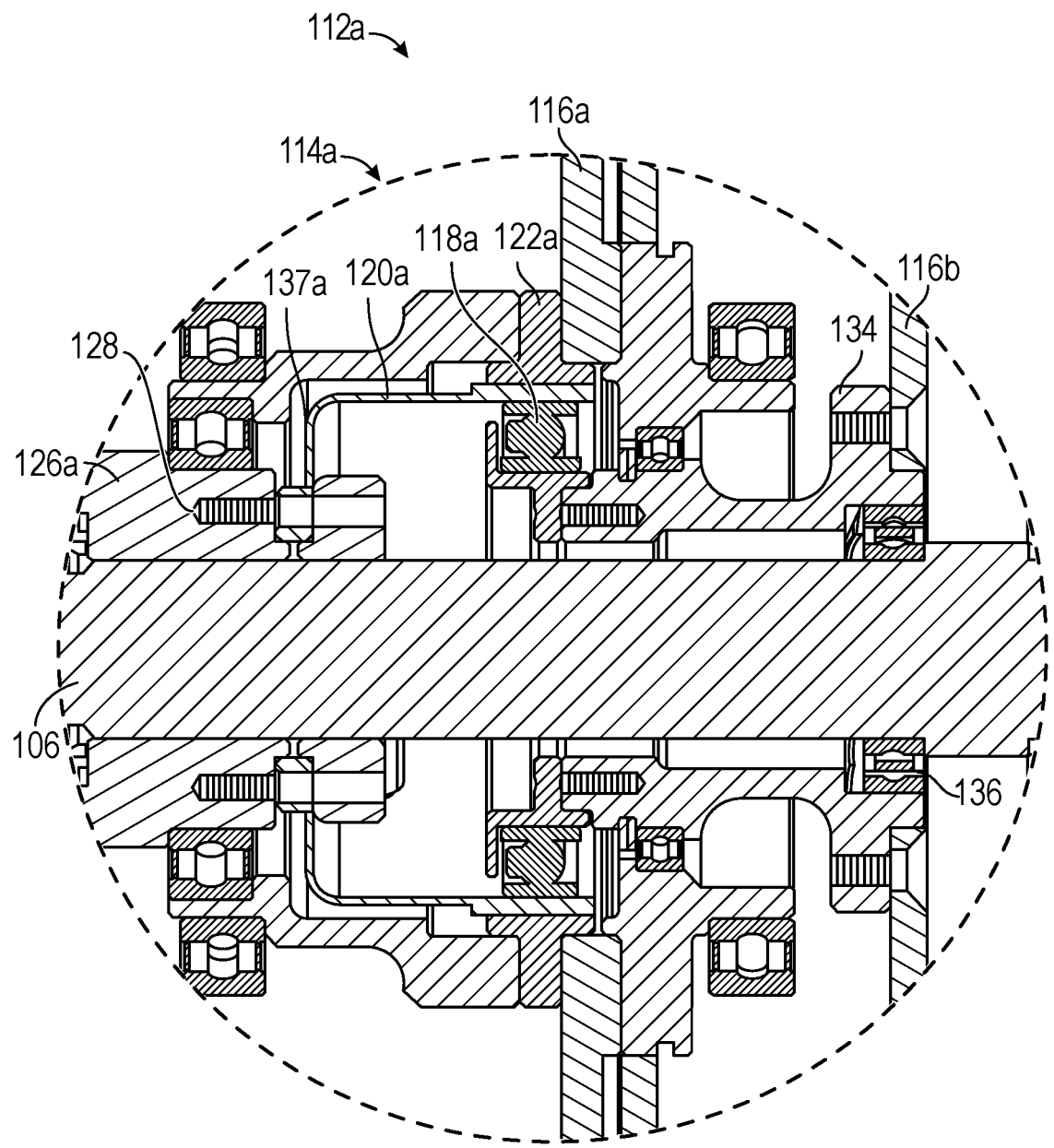
FIG. 3 depicts a cross-sectional view of a differential of the drivetrain for some embodiments.

Turning now to FIG. 3, a cross-sectional view of the first differential 112a is illustrated for some embodiments. Second differential 112b may be substantially similar to second differential 112a. Second differential 112b may be a mirror of first differential 112a. First differential 112a comprises first harmonic gear 114a, first outer gear 116a, and first inner gear 116b as discussed above. The first flex spline 120a is fixed to an outer surface of the first wave generator 118a and has external teeth (not shown) that extend radially around first flex spline 120a and mesh with corresponding interior teeth of the first circular spline 122a. The first wave generator 118a has an elliptical shape, and first flex spline 120a flexes to deform to this elliptical shape when affixed to first wave generator 118a. Accordingly, when driven, two regions of teeth of the first flex spline 120a are in contact with the circular teeth of first flex spline 120a. The two regions are on opposing sides of the major axis of the ellipse. The use of differentials 112a, 112b comprising harmonic gears 114a, 114b is advantageous because the harmonic gears 114a, 114b have zero backlash. The harmonic gears 114a, 114b also provide space savings as compared to planetary gear differentials, among other advantages as will be apparent to one of skill in the art. However, it is contemplated that a planetary gear differential may be used to drive shaft 106 without departing from the scope hereof.

The gears 116a, 116b are coupled to the first harmonic gear 114a such that the first harmonic gear 114a functions as a differential. Thus, each gear 116a, 116b may be driven by a respective motor (see FIG. 4) to provide rotational inputs to the first harmonic gear 114a. In some embodiments, first outer gear 116a drives first circular spline 122a, and first inner gear 116b drives first wave generator 118a. For example, first outer gear 116 may be coupled to an outer surface of first circular spline 122a such that rotation of first outer gear 116a causes corresponding rotation of first circular spline 122a, which then rotates first flex spline 120a due to the gear mesh between circular spline 122a and flex spline 120a. First inner gear 116b may be coupled to an inner structure 134 that is coupled to the wave generator 118a, thereby allowing first inner gear 116b to drive first wave generator 118a. The inner structure 134 may be a hollow sleeve or the like that allows shaft 106 to pass therethrough. Bearings 136 may allow rotation of inner structure 134. A wall 137a of the flex spline 120a may receive fasteners 128 to couple flex spline 120a to first outer shaft 126a such that the rotation of first flex spline 120a may be transferred to the first outer shaft 126a and from the first outer shaft 126a to the shaft 106. In some embodiments, gears 116a, 116b rotate in the same direction. In some embodiments, gears 116a, 116b rotate in opposite directions.

As previously mentioned, second differential 112b may mirror first differential 112a such that the frontmost component of first differential 112a (i.e., wall 137a) is the rearmost component (wall 137b) of second differential 112b, as shown in FIG. 3. Accordingly, on second differential 112b, second outer gear 124a may be connected to the circular spline 122b, and second inner gear 124b may be connected to wave generator 118b via a corresponding inner structure 134. In some embodiments, gears 124a, 124b rotate in the same direction. In some embodiments, gears 124a, 124b rotate in opposite directions. In some embodiments, differentials 112a, 112b rotate outer shafts 126a, 126b in the same direction. In some embodiments, differentials 112a, 112b rotate outer shafts 126a, 126b in opposite directions.

Figure 4:
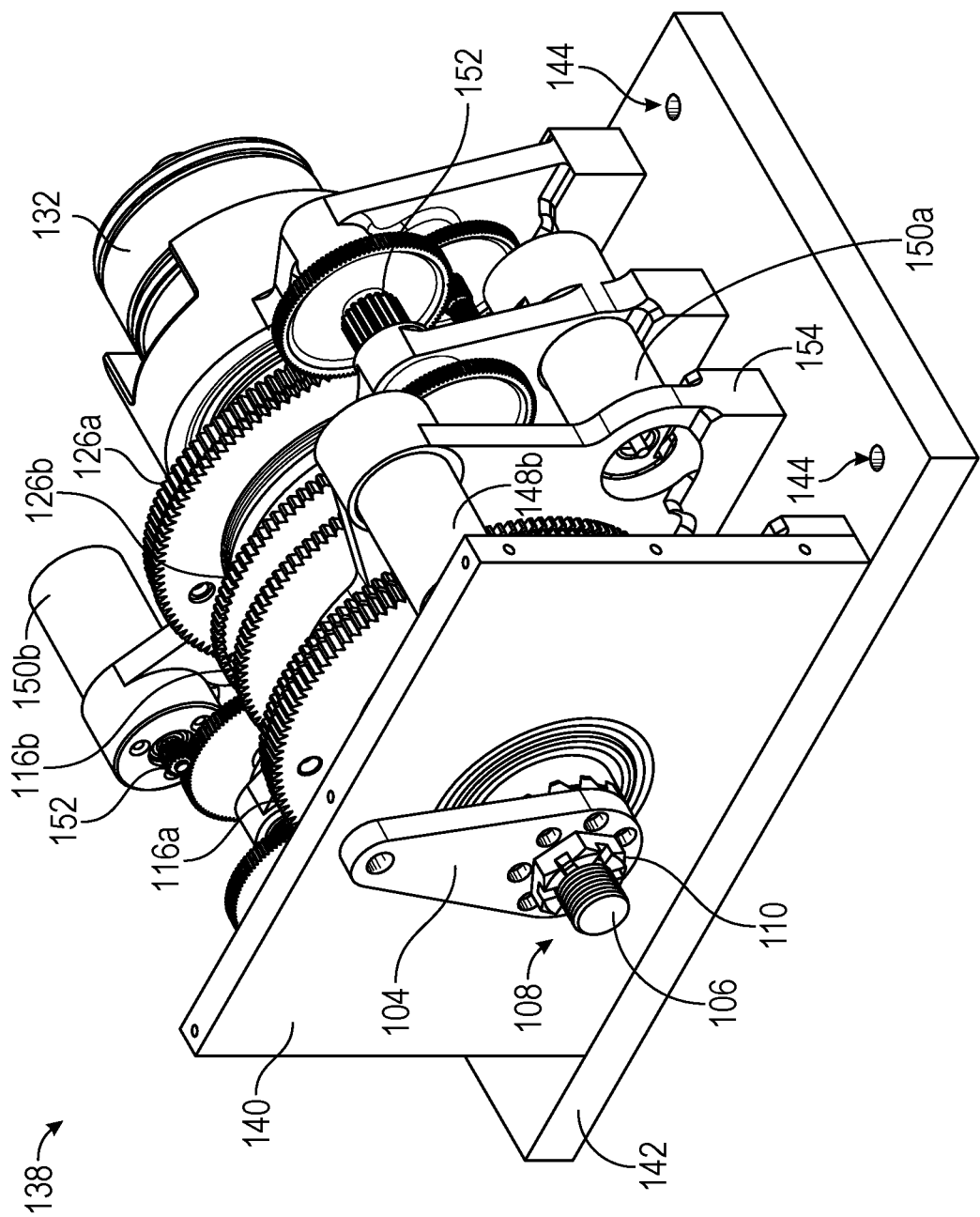
FIG. 4 depicts the FBW servo actuator for some embodiments.
Figure 5:
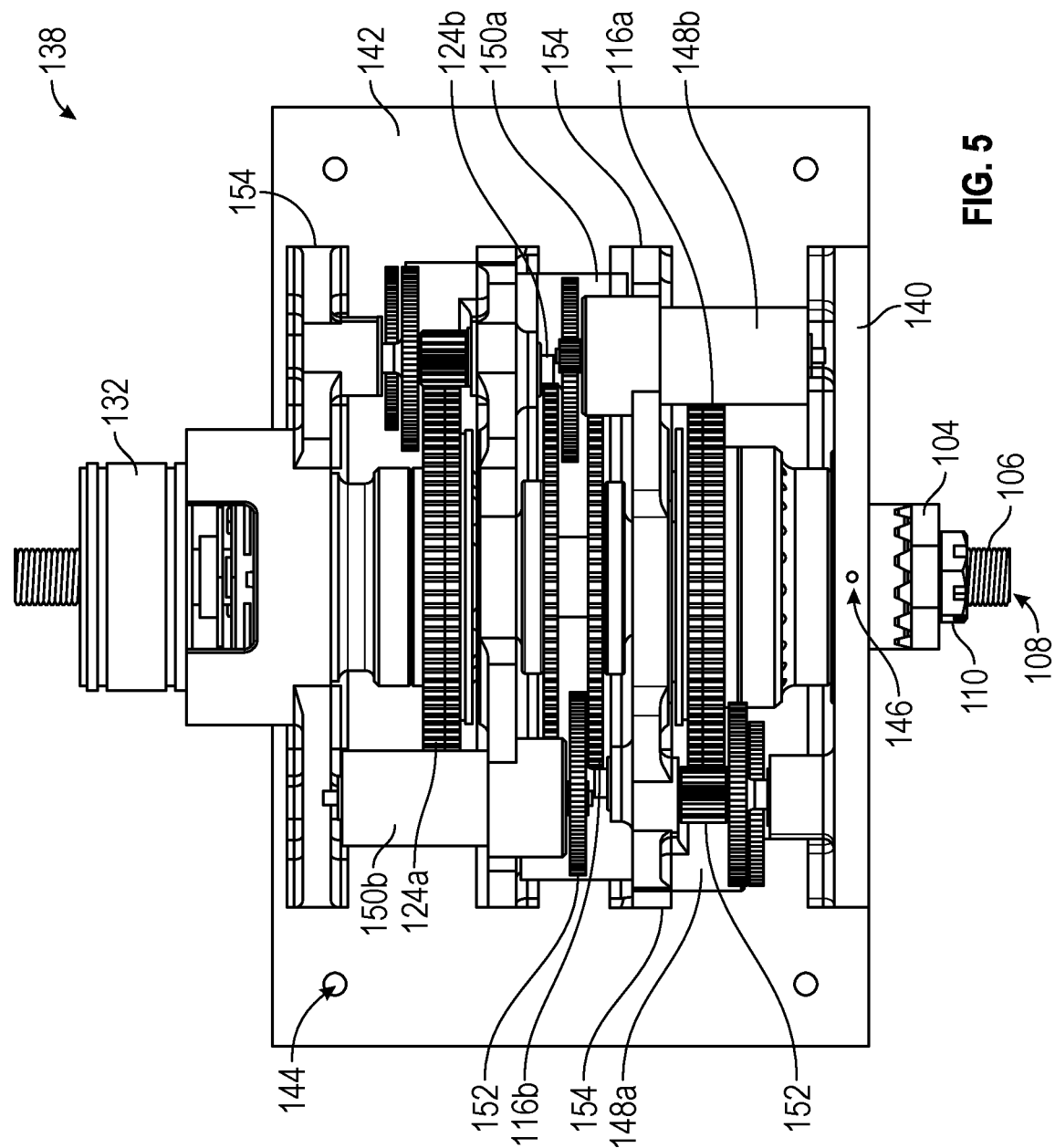
FIG. 5 depicts a top-down view of the FBW servo actuator for some embodiments.
Figure 6:
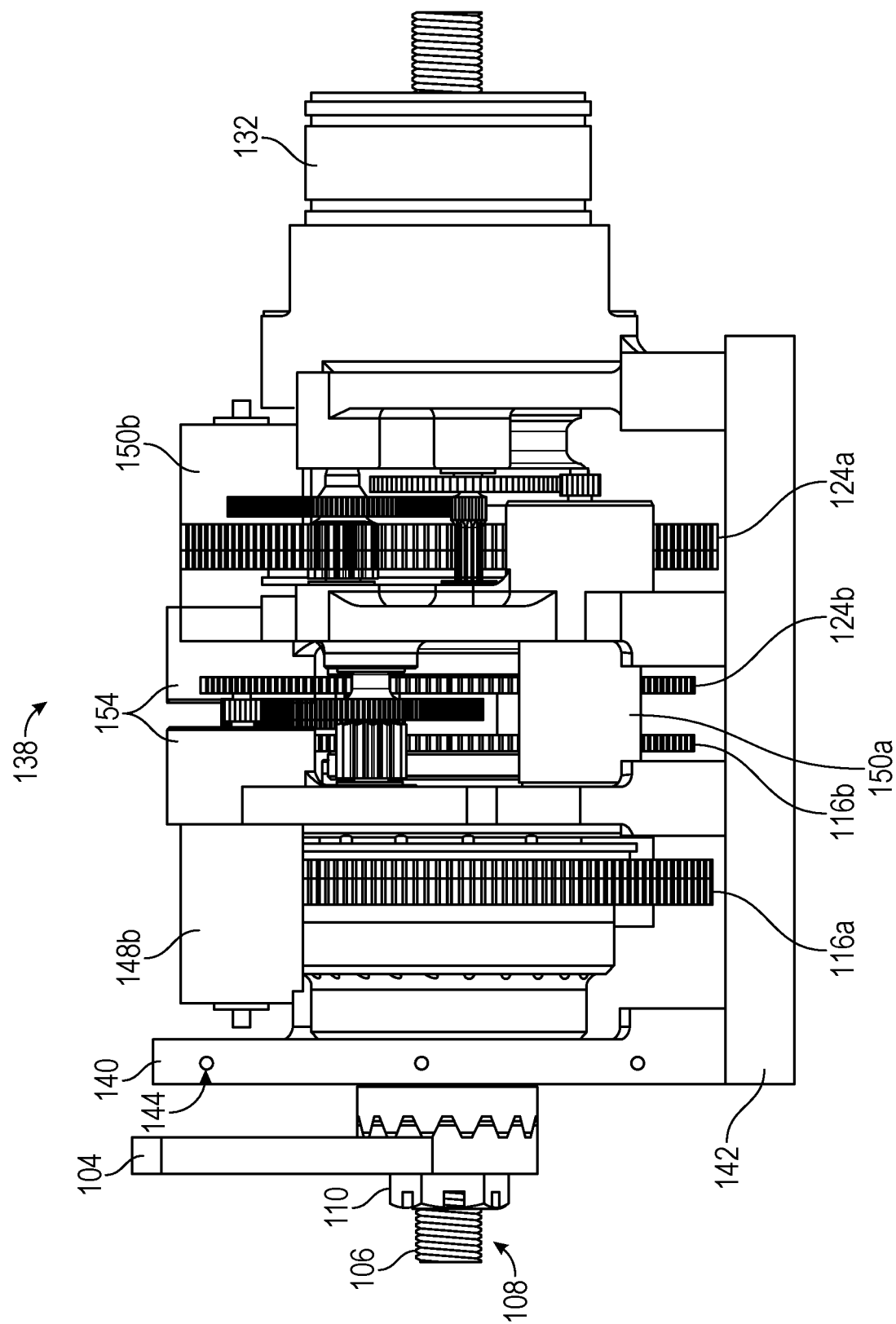
FIG. 6 depicts a side view of the FBW servo actuator for some embodiments.
Figure 7:
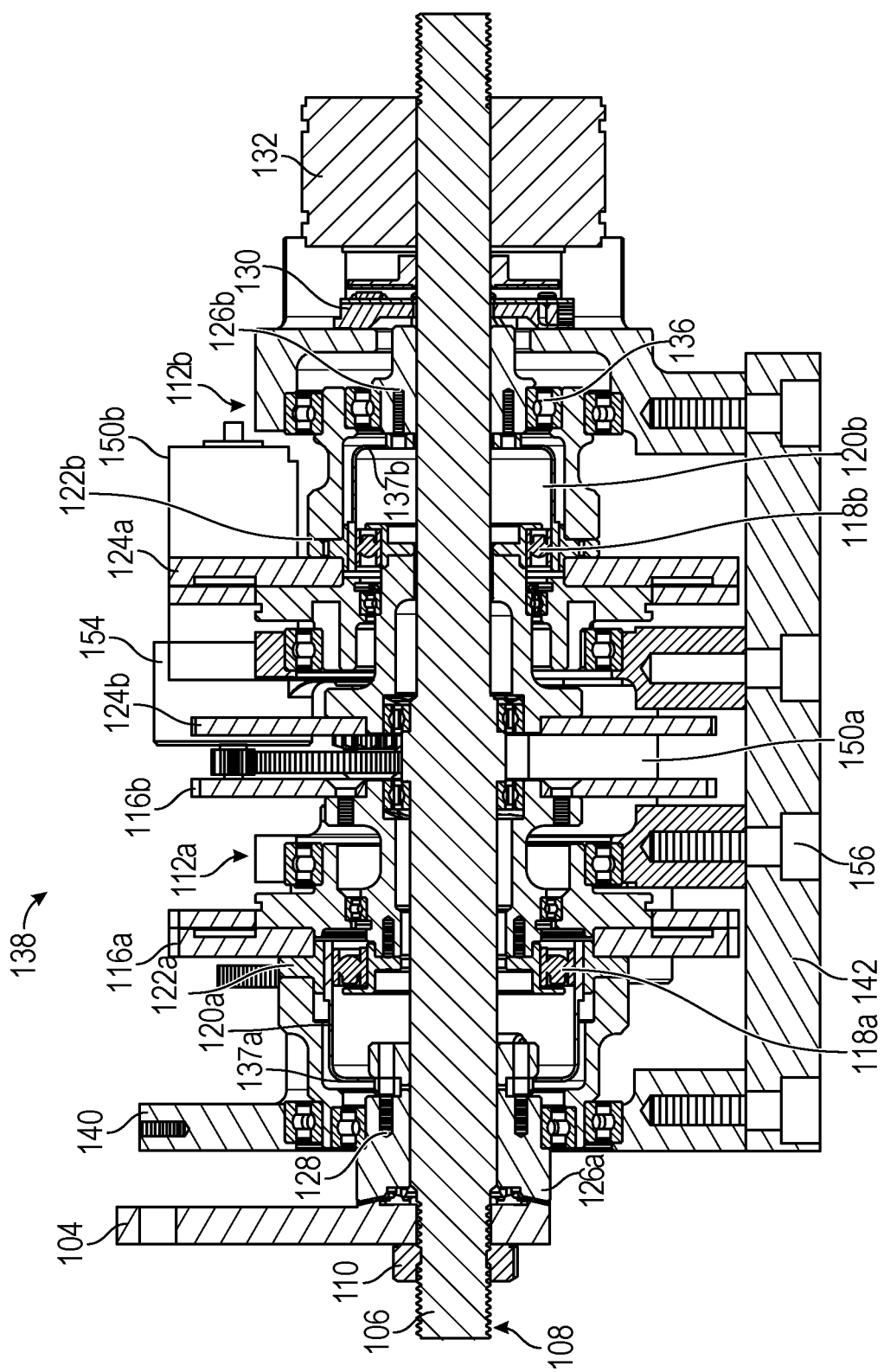
FIG. 7 depicts a cross-sectional side view of the FBW servo actuator for some embodiments.

Turning now to FIGS. 4-7, a number of views of an FBW servo actuator 138 are illustrated in accordance with embodiments of the present disclosure. Specifically, FIG. 4 is a perspective view, FIG. 5 is a top-down view, FIG. 6 is a side view, and FIG. 7 is a cross-sectional side view of FBW servo actuator 138. As shown, FBW servo actuator 138 may comprise a front wall 140 coupled to a base plate 142. Shaft 106 may extend out of front wall 140. Drivetrain 100 may be coupled to base plate 142. Base plate 142 may comprise one or more mounting holes 144 for receiving a fastener therein to couple the FBW servo actuator 138 to another surface or structure, such as within an aircraft, for example.

Figure 8:
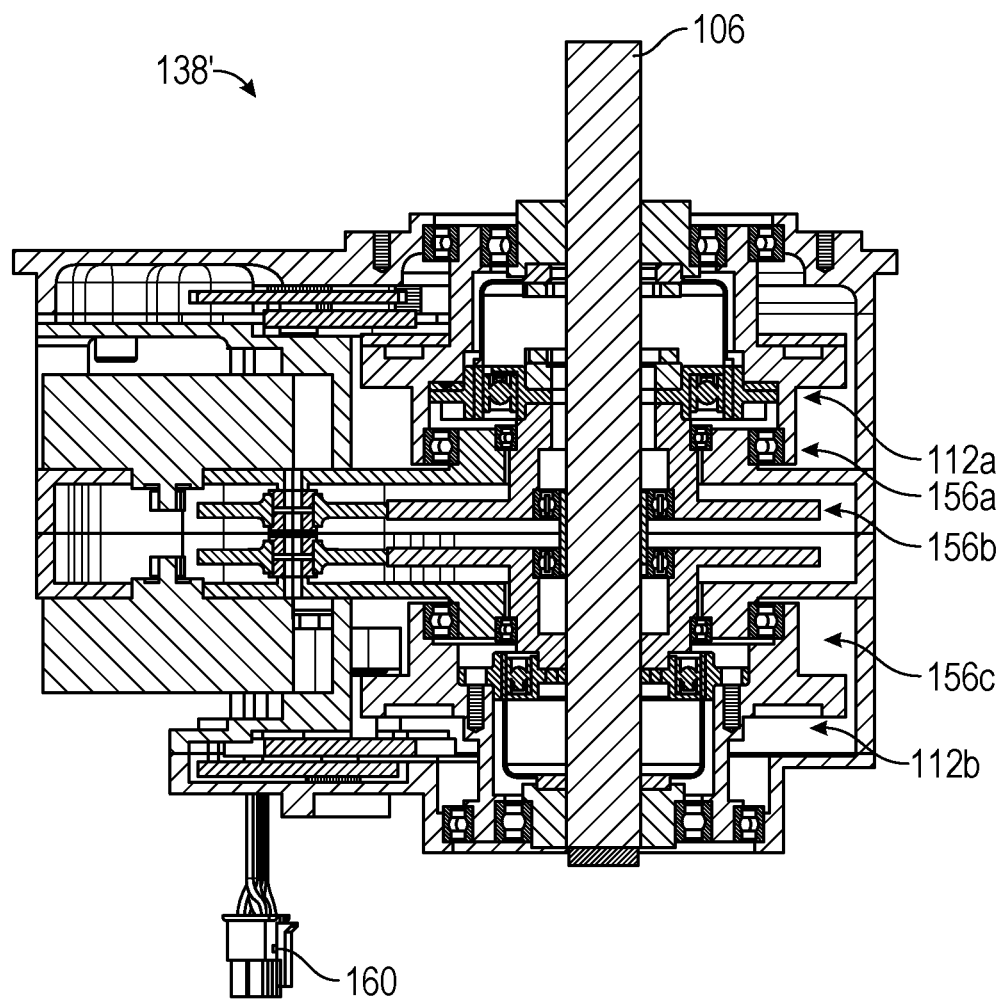
FIG. 8 depicts a cross-sectional view of the FBW servo actuator illustrating inner enclosures for the FBW servo actuator for some embodiments.
Figure 9:
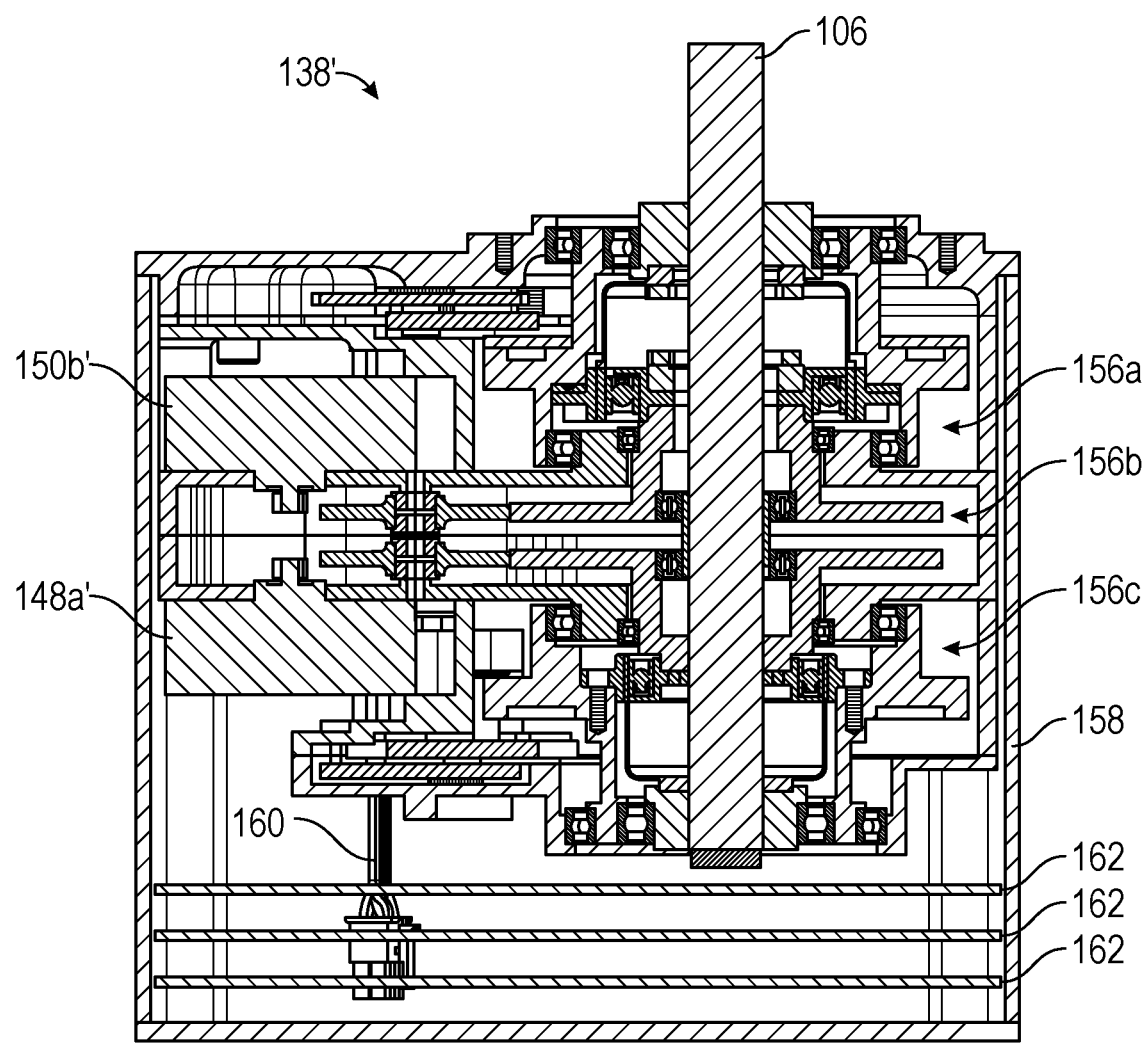
FIG. 9 depicts the cross-sectional view of the FBW servo actuator with an outer enclosure for some embodiments.

Similarly, front wall 140 may comprise one or more mounting holes 146 for receiving a fastener therein to fasten front wall 140 to another structure, such as a housing for the FBW servo actuator 138 as shown in FIGS. 8-9.

As previously discussed, each gear 116a, 116b, 124a, 124b may be driven by a separate motor to provide redundancy in the event of failure. Thus, by providing four motors for the four input gears 116a, 116b, 124a, 124b, if one of the motors fails, only a single gear 116a, 116b, 124a, 124b is affected. If a motor does fail, all or a subset of the working motors may adjust (e.g., increase or decrease) the speed (or other motor parameter, such as power or torque) to compensate for the failed motor.

In some embodiments, FBW servo actuator 138 comprises a first outer gear motor 148a for driving first outer gear 116a, a first inner gear motor 148b for driving first inner gear 116b, a second outer gear motor 150a for driving second outer gear 124a, and a second inner gear motor 150b for driving second inner gear 124b. In some embodiments, first outer gear motor 148a is substantially similar to second outer gear motor 150a. In some embodiments, first inner gear motor 148b is substantially similar to second inner gear motor 150b. In some embodiments, first motors 148a, 148b collectively are configured to operate at the same speed as second motors 150a, 150b. That is, the sum of the motor speed for the first motors 148a, 148b may equal or be substantially equal to (e.g., within a 5% range) of the motor speed of the second motors 150a, 150b. Thus, for example, if second outer gear motor 150a fails, second inner gear motor 150b may be configured to increase the output speed to match the combined output speeds of first motors 148a, 148b. Alternatively, one or both of first motors 148a, 148b may decrease the output speed such that the combined output speed of motors 148a, 148b matches the output speed of second inner gear motor 150b. Adjustments to the motor speeds of motors 148a, 148b, 150a, 150b may occur likewise in the event of failure of any of the motors 148a, 148b, 150a, 150b. Each motor 148a, 148b, 150a, 150b may drive at least one output gear 152 that is meshed (either directly or indirectly) to the corresponding input gear 116a, 116b, 124a, 124b. Each motor 148a, 148b, 150a, 150b may also be mounted to base plate 142 via motor mounts 154. As shown in FIG. 7, one or more fasteners 156 may be inserted through base plate 142 to couple motor mounts 154 to base plate 142 and base plate 142 to front wall 140.

Figure 10:
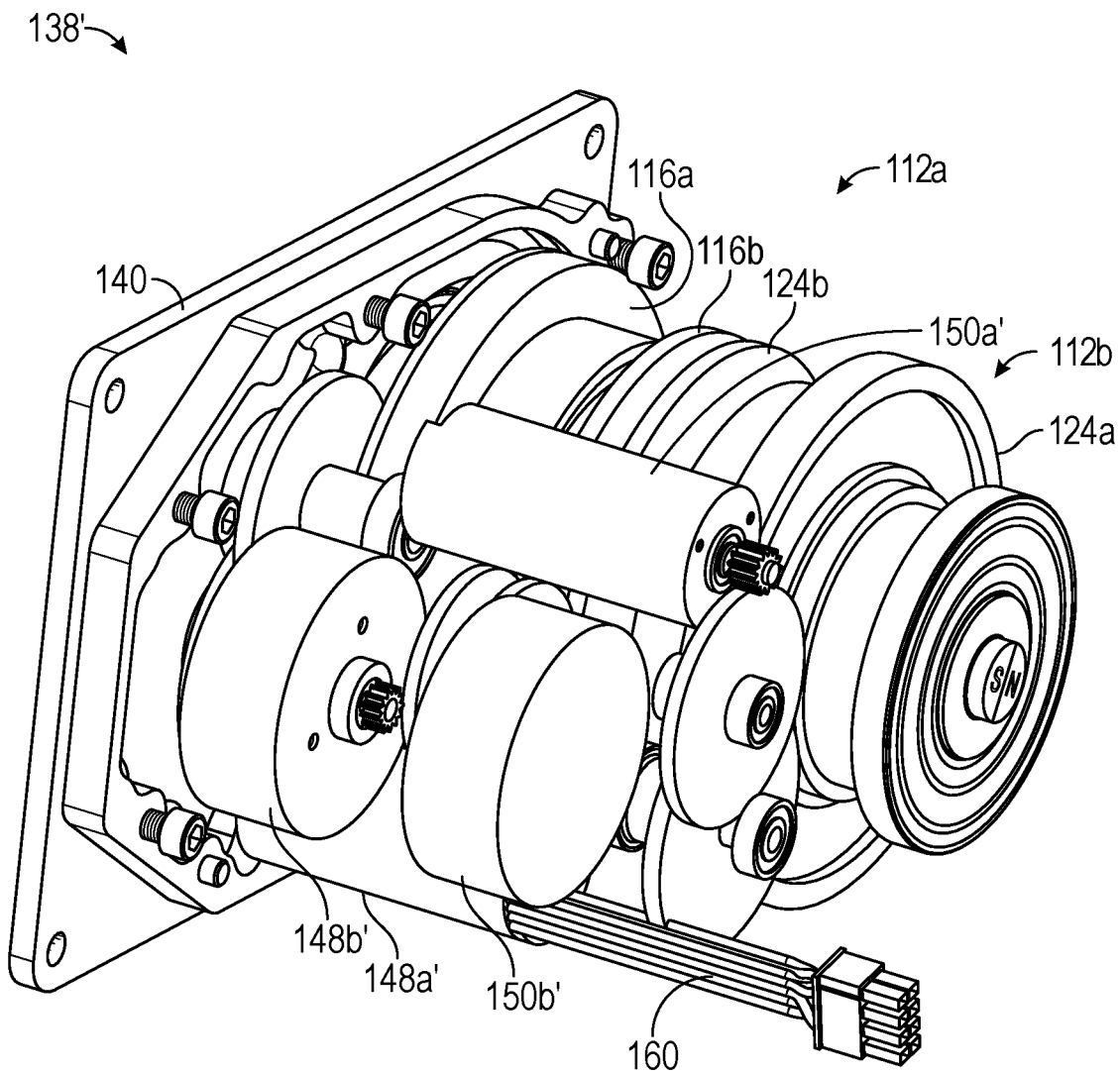
FIG. 10 depicts the FBW servo actuator for some embodiments.

Reference is now made to FIGS. 8-10, depicting an FBW servo actuator 138' in accordance with embodiments of the present disclosure. Servo actuator 138' is substantially similar to FBW servo actuator 138 discussed above; however, motors 148a, 148b, 150a, 150b (denoted as motors 148a', 148b', 150a', and 150') are arranged on a single side of drivetrain 100 as seen best in FIG. 10. FIG. 8 illustrates a top-down cross-sectional view of FBW servo actuator 138' depicting inner enclosures for some embodiments. FIG. 9 depicts a top-down cross-sectional view of FBW servo actuator 138' with inner and outer enclosures of FBW servo actuator 138' for some embodiments. FIG. 10 illustrates a perspective view of the FBW servo actuator 138' illustrated in FIGS. 8 and 9 with the enclosures hidden.

As shown in FIG. 8, FBW servo actuator 138 may comprise a front inner enclosure 156a, a middle inner enclosure 156b, and a rear inner enclosure 156c. Collectively, enclosures 156a, 156b, 156c may house drivetrain 100. The front inner enclosure 156a may house first differential 112a, and the rear inner enclosure 156c may house second differential 112b. Front inner enclosure 156a may be coupled to front wall 140. The middle inner enclosure 156b may house at least a portion of motor mounts 154 and front inner gear 116b and rear inner gear 124b in some embodiments. Shaft 106 may extend through each inner enclosure 156a, 156b, 156c. It will be appreciated that more or fewer than the three inner enclosures 156a, 156b, 156c may be employed without departing from the scope hereof. For example, a single inner enclosure may be used that encompasses drivetrain 100.

As shown in FIG. 9, an outer enclosure 158 may enclose the inner enclosures 156a, 156b, 156c. Outer enclosure 158 may also house the various electronics for FBW servo actuator 138. For example, cables 160 (e.g., motor cables, encoder cables etc.) may be housed within outer enclosure 158. In some embodiments, cables 160 are at least partially housed within inner enclosures 156a, 156b, 156c and outer enclosure 158 and may be connected to the corresponding components within enclosures 156a, 156b, 156c, as will be appreciated by one of skill in the art. Outer enclosure 158 may present a substantially box-like enclosure. Outer enclosure 158 may also house one or more PCBs 162. In some embodiments, outer enclosure 158 comprises three PCBs 162. Fewer or more PCBs 162 may be employed without departing from the scope hereof. PCBs 162 may store the necessary computer-executable instructions to control the operations of FBW servo actuator 138. For example, PCBs 162 may be communicatively coupled to motors 148a, 148b, 150a, 150b to control the operations thereof.

As previously discussed, providing a single FBW servo actuator 138 that is self-contained may reduce latency for FBW operations as crosstalk between FBW servo actuator 138 and a second servo actuator is eliminated. The use of a single actuator per control surface also provides space savings compared to using two actuators and increases the ease of installation and maintenance of the actuators.

It is one advantage of the present disclosure that drivetrain 100 and FBW servo actuator 138 may be assembled using conventional assembly techniques that ease assembling, installation, and service of FBW servo actuator 138. As discussed above, one or more fasteners 128, which may include screws bolts, pins, and the like, may be used to couple various components of drivetrain 100 to one another. For example, flex splines 120a, 120b may be coupled to outer shafts 126a, 126b as shown. Fasteners 128 may also be used to couple gears 116b, 124b to inner structure 134 and inner structure 134 to wave generators 118a, 118b. Thus, the removable fasteners 128 may allow for ease of servicing drivetrain 100 in the event of failure in a gear 116a, 116b, 124a, 124b, for example. Likewise, as discussed with respect to FIG. 7, fasteners 156 may be used to secure base plate 142 to front wall 140 and motor mounts 154. Adhesives (e.g., epoxy) may also be used to secure various components of FBW servo actuator 138. For example, adhesives may be used to secure PCBs 162 within outer enclosure 158.

FIGS. 11-14 illustrate a second FBW actuator 200 for some embodiments of the present disclosure. Like FBW servo actuator 138 discussed above, FBW actuator 200 may comprise a drivetrain 202 comprising a first differential 204a and a second differential 204b. In contrast to FBW servo actuator 138, differentials 204a, 204b may be on a first side 206a and a second side 206b, respectively, of second FBW actuator 200. Each differential 204, 206 may comprise a harmonic gear 208a, 208b. First harmonic gear 208a comprises first wave generator 210a, first flex spline 212a, and first circular spline 214a, and second harmonic gear 208b likewise comprises second wave generator 210b, second flex spline 212b, and second circular spline 214b.

Differentials 204a, 204b may drive an output shaft 216. Rotation of output shaft 216 may cause rotation of output arms 218, which are located between (e.g., equidistantly from) differentials 204a, 204b. As shown, output shaft 216 is coupled to two output arms 218, which provides further redundancy in the event of a failure in one of the output arms 218. The output arms 218, in turn, may be coupled to a pushrod 220. The pushrod 220 may be configured to actuate a control surface, as previously discussed. It is contemplated that output arms 218 may couple to more than one pushrod 220 to provide additional redundancy if a pushrod fails. Furthermore, it is contemplated that other mechanisms for actuating control surfaces, such as capstans, or other mechanical linkages, may be used without departing from the scope hereof.

In some embodiments, a first motor 222a and a second motor 222b are configured to drive first differential 204a. First motor 222a may be connected to a gear set 224 configured to mesh with an input gear 226 for driving first differential 204a. Similar to gears 116a, 124a discussed above, input gear 226 may provide input to circular spline 214a. Second motor 222b may be a direct drive motor that drives wave generator 210a. Flex spline 212a may serve as the output for differentials 204a, 204b. Flex spline 212a may be coupled to an outer shaft 228a that rotates output shaft 216. Input gear 226 and second motor 222b may rotate in the same direction or in opposite directions.

Second side 206b may be substantially similar to first side 206a. A third motor 230a may correspond to first motor 222a and drive a gearset 232 that drives an input gear 234. Input gear 234 may be substantially similar to input gear 226 and may provide input to a circular spline 214b. Likewise, a fourth motor 230b may be a direct drive motor that drives a wave generator 210b. The flex spline 212b of may be coupled to an outer shaft 228b to drive output shaft 216. Input gear 234 and fourth motor 230b may rotate in the same direction or opposite directions. Differentials 204a, 204b may cause rotation of outer shafts 228a, 228b in the same direction or opposite directions.

As with FBW servo actuator 138, the use of four motors 222a, 222b, 230a, 230b provides for redundancy in second FBW actuator 200. Thus, if a motor 222a, 222b, 230a, 230b fails, a corresponding motor can increase the output thereof to compensate for the loss of the failed motor. Additional redundancy is provided by way of multiple output arms 218 and/or multiple pushrods 220.

Figure 13:
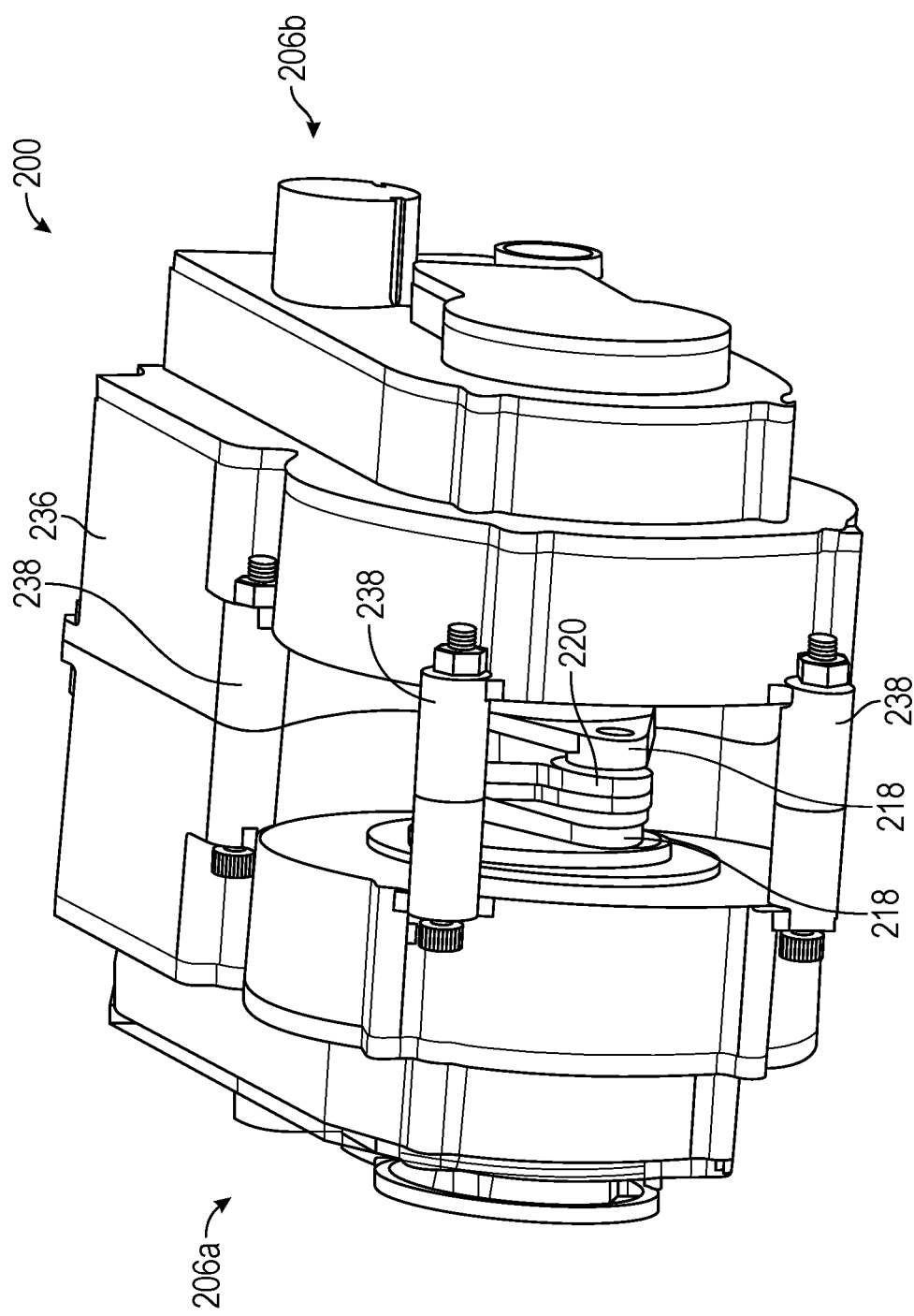
FIG. 13 depicts the second FBW servo actuator for some embodiments.
Figure 14:
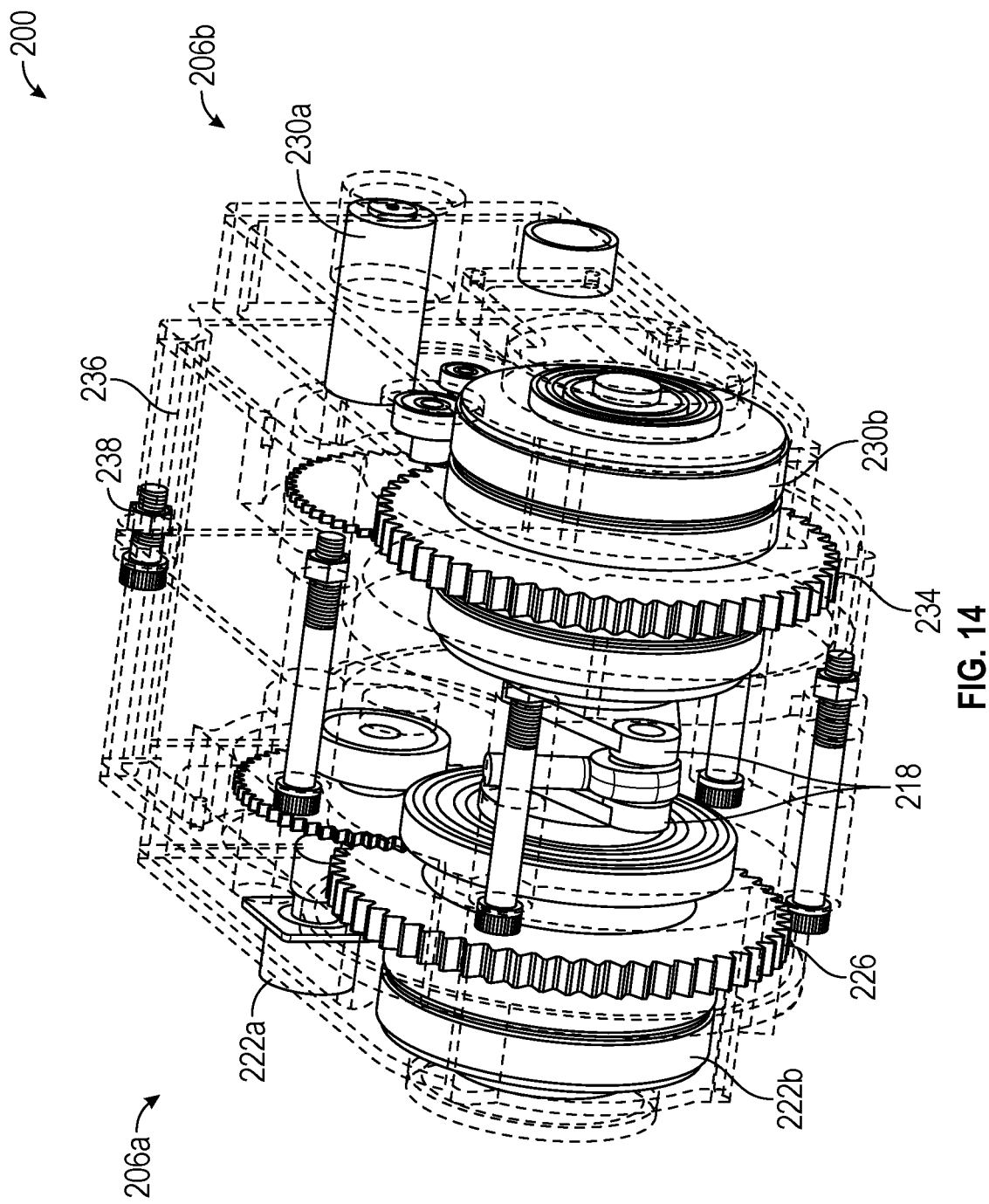
FIG. 14 depicts the second FBW servo actuator with housing depicted transparently for some embodiments.

FIG. 13 illustrates second FBW actuator 200 with a housing 236, and FIG. 14 illustrates second FBW actuator 200 with the housing 236 shown transparently as indicated by the dashed lines. In some embodiments, housing 236 is a two-piece housing coupled together by fasteners 238. For example, a first housing piece may house first side 206a, and a second housing piece may house second side 206b. Fasteners 238 may couple the first housing piece to the second housing piece. In some embodiments, output arms 218 and pushrod 220 are not contained within housing 236.

Figure 15:
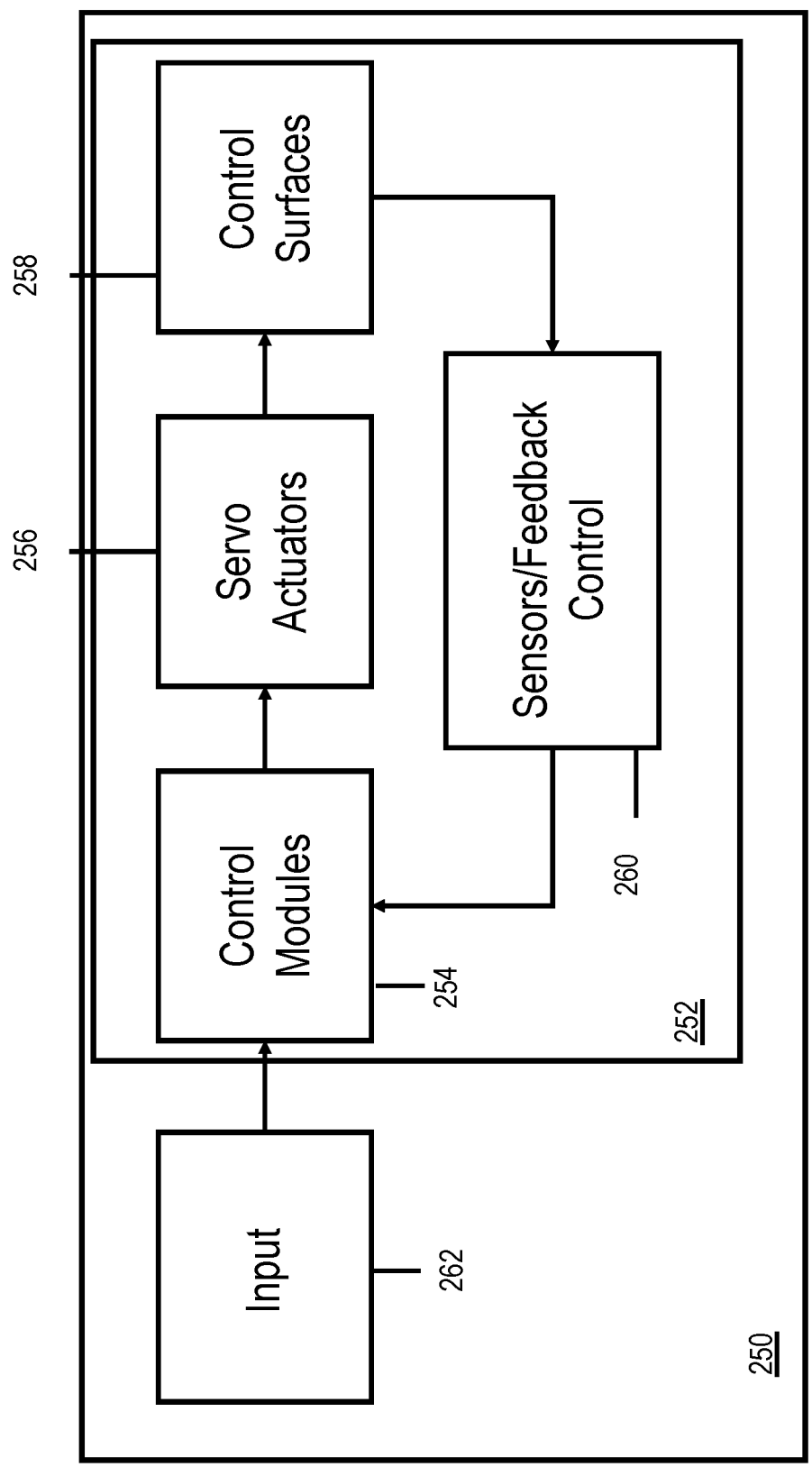
FIG. 15 depicts a block diagram in accordance with embodiments of the present disclosure.

FIG. 15 schematically depicts an aircraft 250 having a FBW system 252 in accordance with embodiments of the present disclosure. FBW system 252 may comprise control module 254, servo actuators 256, control surfaces 258, sensors/feedback control 260, or any combination thereof. Servo actuators 256 may correspond to FBW servo actuators 138, 138', 200 discussed above. Operations of servo actuators 256 may be controlled by control module 254 to actuate control surfaces 258. Control surfaces 258 may be control surfaces for primary flight control such as the ailerons, rudders, and elevators. Feedback control 260 may include sensor data and/or feedback information relating to the position/operation of control surfaces 258 that may be provided to control module 254 to adjust the operations of servo actuators 256. Thus, for example, failure and/or improper operations of gears or motors within actuators 256 may be communicated to control module 254 by feedback control 260, and control module 254 may instruct servo actuators 256 to adjust the operations thereof accordingly. Control module 254 may instruct servo actuators 256 to actuate control surfaces 258 to a desired position based on input 262 received from an operator (e.g., a pilot or autopilot system).

FBW With FCC Integrated Servos

A FBW system comprising servo actuators having integrated flight control computers (FCCs) is discussed hereinafter. The FBW system may include a plurality of servo actuators for controlling flight control surfaces, where each servo actuator may comprise a FCC such that input (e.g., from a pilot, autopilot system, or flight guidance system) may be processed at the servo actuators to control the output of the servo actuator according to relevant control laws rather than being processed solely by the primary FCC on the aircraft. Additional data, such as sensor data indicative of altitude, attitude, etc., that may be used in the FCC processing may likewise be communicated directly to the servo FCCs.

The servo actuators may control the position of flight control surfaces, such as primary flight control surfaces (elevator, aileron, rudder) or secondary control surfaces (flaps, spoilers, trim tabs, etc.). In some embodiments, for a flight control surface, a primary and a secondary (or redundant) servo actuator. The secondary servo may be configured to take over in the event of a failure in the primary servo. The primary and secondary servos may each comprise a FCC, where the FCC on the primary servo may utilize hardware dissimilar from hardware of the secondary servo FCC. For example, the computer(s) on the primary servo actuator may include computing hardware (e.g., processor, memory, etc.) from different manufacturers. As such, in some embodiments, the FCC software may be compiled differently on the primary and secondary servos due to the differences in hardware, which may mitigate the likelihood of common mode failures. The FBW system may also provide engine/thrust control for the aircraft.

System Overview

Figure 16:
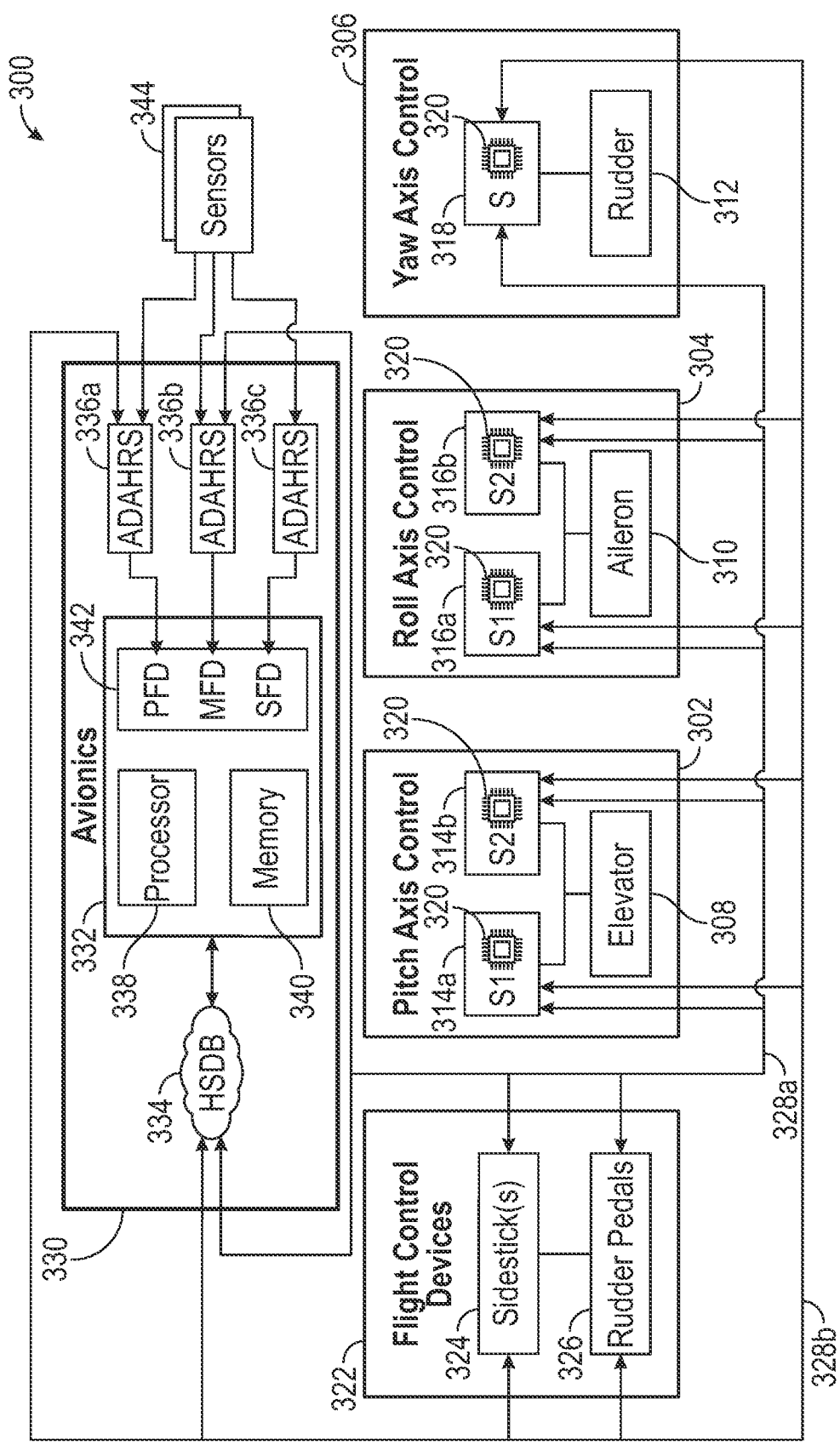
FIG. 16 depicts a block diagram of a FBW system in accordance with embodiments of the present disclosure.

Turning now to FIG. 16, a block diagram of a FBW system 300 is illustrated for some embodiments. FBW system 300 may be employed in aircraft, (airplanes, helicopters, rotorcraft, urban air mobility vehicles, drones, etc.) such as FBW system 252, or in other vehicles. System 300 may comprise pitch axis control 302, roll axis control 304, and yaw axis control 306. Pitch axis control 302 may be configured to control the position of an elevator 308, roll axis control 304 may be configured to control the position of an aileron 310, and yaw axis control 306 may be configured to control the position of a rudder 312. In some configurations, system 300 may include any number of additional axes, such as a fourth axis for engine control (speed, thrust, power, etc.).

Each axis control 302, 304, 306 may comprise at least one servo actuator as discussed above, which may in some embodiments correspond to any of servo actuators 138, 138', 200, 256. In some embodiments, the servo actuator is a linear and/or a rotary servo actuator. Generally, any type of servo actuator may be used without departing from the scope hereof. In some embodiments, pitch axis control 302 comprises a primary pitch servo 314a and a secondary pitch servo 314b. In some embodiments, roll axis control 304 comprises a primary roll servo 316a and a secondary roll servo 316b. As shown, yaw axis control 306 may comprise a single yaw servo 318; however, it is contemplated that a primary and secondary yaw servo may likewise be provided. As should be appreciated, any number of servos may be provides for any number of functions. For instance, a single servo may be provided for pitch/roll control.

Each servo 314a, 314b, 316a, 316b, 318 may comprise a flight control computer (FCC) 320 thereon to control the operation of the respective servo 314a, 314b, 316a 316b, 318 to position a flight control surface. FCC 320 may be programmed to carry out all or a subset of the functions typically carried out by the primary FCC, such as calculations according to control laws that determine how a servo actuator should be operated to adjust a control surface. FCC 320 may provide any other functions, including for example, input/output processing, sensor selection, mode management, health monitoring, combinations thereof, and the like.

By employing FCC-integrated servo actuators, rather than pilot input being communicated to dedicated FCC(s), the FCC(s) performing control law calculations and subsequently commanding the servo actuators to operate based on the results, the input (and other necessary data) may be transmitted directly to each FCC-integrated servo and processed by the FCC-integrated servo to position each flight control surface. Including an integrated FCC within each servo actuator may increase system redundancy, which provides safety benefits in the event of a failure. In some embodiments, another FCC-integrated servo may act as that monitor. In other words, each servo may look at its own calculations and the same calculations performed by another servo. For example, the servo actuator could have a backup processor that operates as in typical FBW systems, which could be used to control the servo actuator based on signals from the primary FCC if the integrated FCC 320 were to fail. In some embodiments, the primary FCC does not perform control law calculations, and all processing for controlling the operation of the servo actuators is performed by the servo FCCs 320. Dedicated FCCs may or may not exist in the system. If they don't exist, all control law calculations may be done by the FCC-integrated servos. If they do exist, each servo may use a combination of dedicated FCC and integrated FCC calculations.

System 300 may further comprise one or more flight control devices 322 for a pilot and/or copilot to provide input to cause a corresponding action to be taken by one or more of pitch axis control 302, roll axis control 304, or yaw axis control 306 to adjust a corresponding control surface. Input received at flight control devices 322 may be communicated directly to axis controls 302, 304, 306 for interpretation by the FCCs 320 thereon to determine the appropriate actuation to adjust the elevator 308, aileron 310, rudder 312, or any combination thereof. For example, and as discussed further below, pilot input may be measured by various sensors to determine a desired position of one or more of elevator 308, aileron 310, or rudder 312, and the desired position may be communicated to the corresponding servo FCCs.

In some embodiments, the flight control devices 322 comprise at least one sidestick 324 (or other control input such yoke, side yoke, stick, as described below) and one or more rudder pedals 326. The sidestick 324 may be used by the pilot to adjust the pitch and roll axis command, while the rudder pedals 326 may be used to adjust the yaw axis command. As discussed above, the output of actuating flight control devices 322 may be a desired command of one or more flight control surfaces that is communicated to one or more servos 314a, 314b, 316a, 316b, 318 such that the servo can take the appropriate action (if any action is required) based on the pilot input. Flight control devices 322 may comprise other flight control devices, such as a yoke, a stick, a control column or wheel, a throttle input (e.g., lever, knob, or wheel), a trim wheel, or the like.

Data in system 300 may be communicated along a first data bus 328a and/or a second data bus 328b, which in some embodiments, are ARINC (Aeronautical Radio, Incorporated) data buses, such as ARINC 429. Generally, any communication method may be used, such as communication via a wired network (e.g., USB, Ethernet, etc.) or a wireless network (e.g., controller area network or a vehicular area network, Wi-Fi, BLUETOOTH, etc.). In some embodiments, data in FBW system 300 is communicated along both buses 328a, 328b to ensure the data reaches the intended destination. For example, the same control signal indicative of a desired elevator position may be communicated along first data bus 328a and second data bus 328b. Therefore, redundancy in data arriving at an intended destination is provided by sending the same data along multiple data buses 328a, 328b. As illustrated, data buses 328a, 328b communicatively couples pitch axis control 302, roll axis control 304, yaw axis control 306, flight control devices 322, and avionics 330 such that data may be transferred there between.

Also illustrated in FIG. 16 is avionics 330. Avionics 330 may include a computer 332, data interfaces 334, a first air data, attitude, heading reference system (ADAHRS) 336a, a second ADAHRS 336b, and a third ADAHRS 336c, which may be configured as a standby ADAHRS. Data buses 328a, 328b may be coupled to data interface 334 for data to be communicated (including bi-directionally) within FBW system 300 as previously discussed. Computer 332 may comprise a processor 338, a memory 340, and a display 342. Computer 332 may have any or all of the components discussed below with respect to FIG. 19. Computer 332 may correspond to a primary flight control computer that controls operations of an aircraft during flight or provides other functions such as sensor management. It will be appreciated that multiple computers 332 may be provided for redundancy. One or more sensors 344 may also be provided and may provide data to avionics 330, which may be interpreted by computer 332 for display on display 342. Additionally, sensor data may be communicated to axis controls 302, 304, 306 and/or flight control devices 322 along buses 328a, 328b. The sensor data may be used by computer 332 and/or FCCs 320 for flight control calculations to determine the appropriate actuation of a servo actuator as will be appreciated by one of skill in the art. The sensors may include GPS sensors, pitot/static instruments, angle of attack sensors, radar altitude sensors, engine sensors, or the like. In some embodiments, the sensors 344 include ice detectors to detect icing.

Display 342 may include one or more displays and may display data to a pilot and may, in some embodiments, be a flight deck display. The display 342 may include a primary flight display (PFD), multi-functional display (MFD), and may be configured to display standby flight data. Primary flight display may display information such as primary flight data, flight/thrust director, a flight management system, FBW system status, or any combination thereof. The multi-function display may display similar information to the PFD and either or both of the PFD and the MFD may be programmable/customizable by the pilot/copilot to display desired information.

First ADAHRS 336a may receive data from first data bus 328a, and may communicate the received data for display on the PFD. First ADAHRS 336a may also receive sensor data from sensors 344. For example, ADAHRS 336a may be communicatively coupled to computer 332, and processor 338 may be configured to execute computer-executable instructions to cause the display of primary flight data on the PFD based on the data received from ADAHRS 336a via first data bus 328a and sensors 344. Similarly, ADAHRS 336b may communicate data received from data buses 328b and/or sensors 344 to computer 332 for display on the MFD. The standby ADAHRS 336c may take over for either ADAHRS 336a, 336b in the event of a failure. In some embodiments, each ADAHRS 336a, 336b, 336c is configured to receive a plurality of sensor data from sensors 344. In some embodiments, ADAHRS 336a receives data from a first set of sensors 344, and ADAHRS 336b receives data from a second set of sensors 344, thereby enabling data to be displayed in the event sensor data from a sensor becomes unavailable. For example, first ADAHRS 336a may receive GPS data, altitude data, pitot/static data, angle of attack data, from a first GPS sensor, a first altitude sensor, a first pitot/static sensor, and a first angle of attack sensor, while second ADAHRS 336b may receive GPS, altitude, pitot/static, and angle of attack data from distinct second GPS, altitude, pitot/static, and angle of attack sensors. In some embodiments, the standby ADAHRS 336c receives data from any of the above-described sensors. In some embodiments, ADAHRS 336c receives data only from a pitot/static sensor. It will be appreciated that the ADAHRSs 336a, 336b, 336c may receive other sensor data (e.g., from an ice detector) without departing from the scope hereof.

Flight Control Devices

Figure 17A:
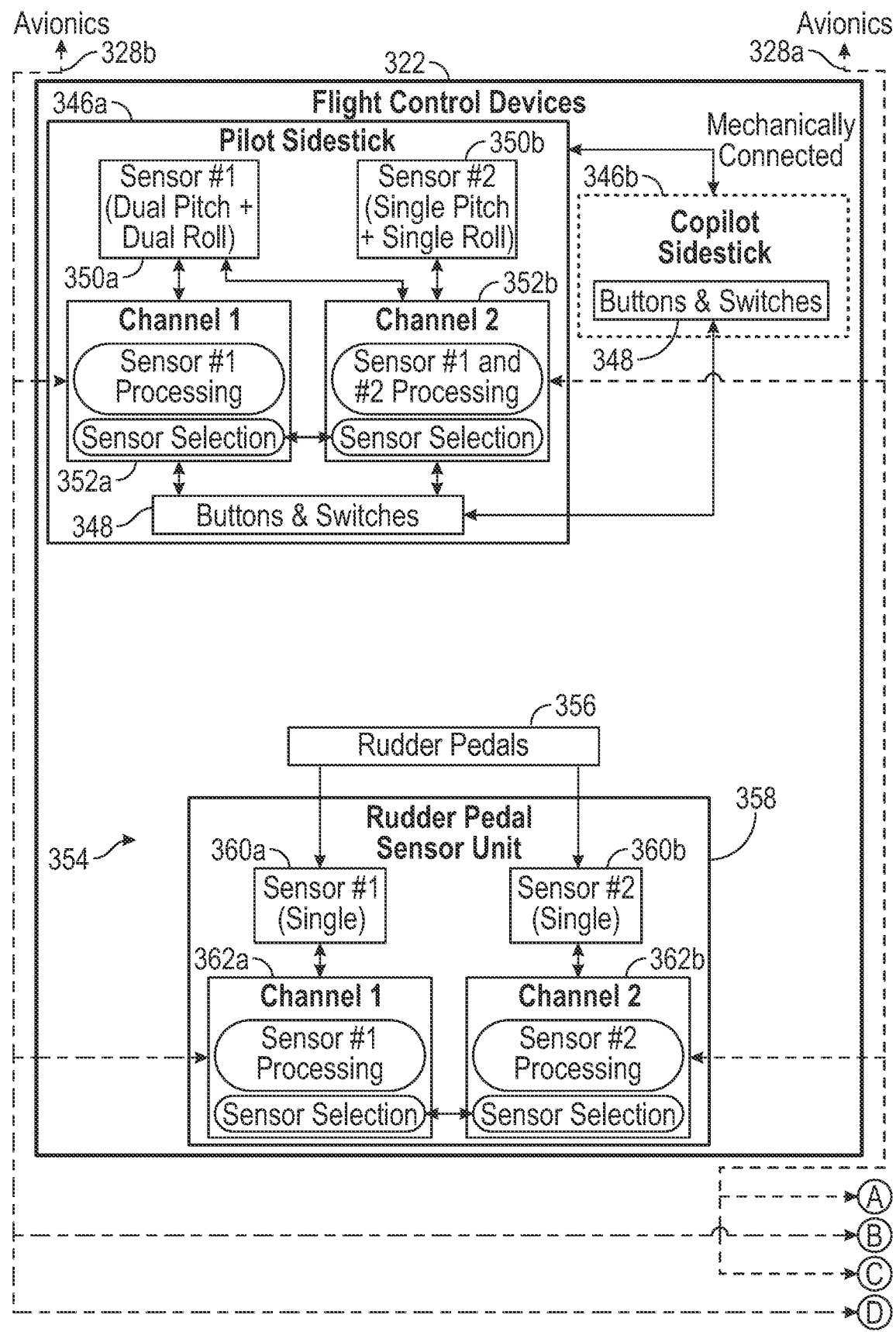
FIG. 17A illustrates a block diagram of flight control devices of the FBW system for some embodiments.

Turning now to FIG. 17A, flight control devices 322 are illustrated in further detail in accordance with aspects of the present disclosure. As discussed above, axis controls 302, 304, 306 may operate based on input from flight control devices 322. In some embodiments, flight control devices 322 comprise a pilot sidestick 346a and a copilot sidestick 346b. Sidesticks 346a, 346b may correspond to sidesticks 324 discussed above. In some embodiments, only a single sidestick (e.g., pilot sidestick 346a) is provided. The sidesticks 346a, 346b may be active sidesticks that provide tactile feedback to the pilot. Additionally, as illustrated, copilot sidestick 346b may be mechanically connected to pilot sidestick 346b such that movement of a sidestick 346a, 346b is reflected in the other sidestick 346a, 346b. Each sidestick 346a, 346b may comprise inputs 348, such as buttons and/or switches actuatable by the pilot/copilot. The inputs 348 may include inputs for autopilot disconnect, push-to-talk, sidestick priority, or the like. Inputs 348 on the copilot sidestick 346b may be routed through pilot sidestick 346a.

Sidestick 346a may comprise a first position sensor 350a and a second position sensor 350b. First position sensor 350a may be of a dissimilar sensor type than second position sensor 350b. For example, first position sensor 350a may be a dual pitch, dual roll position sensor, and second position sensor 350b may be a single pitch, single roll position sensor. Thus, sidestick 346a may include a total of three pitch axis sensors and three roll axis sensors. First position sensor 350a may be communicatively coupled to a first processing channel 352a and to a second processing channel 352b, while second position sensor 350b may only be communicatively coupled to second processing channel 352b. In some embodiments, position sensor 350a is only coupled to processing channels 352b, and position sensor 350b is coupled to both processing channels 352a, 352b.

In some embodiments, the processing channels 352a, 352b are embodied as distinct microprocessors, for example. The processing channels 352a, 352b may include any of the components discussed below with respect to FIG. 19. Each processing channel 352a, 352b may be configured to: independently process data from the connected position sensors 350a, 350b, independently read inputs from inputs 348, independently send sensor data on a respective data bus 328a, 328b, or any combination thereof. Additionally, processing channels 352a, 352b may be communicatively coupled to compare detected positions, for example.

Under normal operation conditions, processing channels 352a, 352b may implement multi-sensor voting (e.g., 3-sensor voting) to output a selected position for each axis, and the selected position may be communicated on each data bus 328a, 328b and from the data buses 328a, 328b to axes controls 302, 304, 306 and avionics 330. When operating in abnormal conditions (e.g., under alternate law), other methods of determining the selected position may be employed. Generally, any method of determining a selected position is within the scope hereof. In some embodiments, copilot sidestick 346b is substantially similar to pilot sidestick 346a and may include any or all of the components discussed above. In some embodiments, copilot sidestick 346b does not include the above-described position sensors and processing channels and, because the two sidesticks 346a, 346b are mechanically coupled, movement in the copilot sidestick 346b is reflected in the pilot sidestick 346a such that the sensors 350a, 350b and processing channels 352a, 352b in the pilot sidestick 346a can measure and process input from the copilot sidestick 346b.

In some embodiments, the ergonomic components of each sidestick 346a, 346b (e.g., inputs 348, gripping features, etc.) are mechanically contained within the same housing as the sensors 350a, 350b and processing channels 352a, 352b. In some embodiments, the ergonomic components are contained in a separate enclosure from the sensors 350a, 350b, and processing channels 352a, 352b.

For adjusting the position of rudder 312, a rudder pedal interface 354 may be provided and likewise located in the cockpit as is known by those skilled in the art. In some embodiments, the rudder pedal interface 354 comprises rudder pedals 356 (corresponding to rudder pedals 326 discussed above) and a rudder pedal sensor unit 358. The rudder pedal sensor unit 358 may detect the position of rudder pedals 356 and communicate the sensed position to yaw axis control 306 (and elsewhere in FBW system 300) via buses 328a, 328b. In some embodiments, rudder pedal sensor unit 358 comprises a first position sensor 360a and a second position sensor 360b. First position sensor 360a may be dissimilar from second sensor 360b (e.g., of a different sensor type), and each position sensor 360a, 360b may be communicatively coupled to a respective processing channel 362a, 362b. Processing channel 362a may likewise be dissimilar from processing channel 362b. For example, first processing channel 362a may include a different processor (e.g., microprocessor) from second processing channel 362b. Processing channels 362a, 362b may include any of the components discussed below with respect to FIG. 19. Both processing channels 362a, 362b may operate independently but may also compare sensor data from the respective sensor 360a, 360b, for example, to perform fault detection. Therefore, if there is a discrepancy between the sensor data, corrective action(s) can be taken. The two channels 362a, 362b may perform sensor selection to determine the output desired rudder position to yaw axis control 306.

As shown, data buses 328a, 328b allow for data to be transmitted from flight control devices 322 to other portions of FBW system 300. Each data bus 328a, 328b may transmit data to avionics 330. Additionally, data buses 328a, 328b may transmit data to pitch axis control 302 (data paths labeled 'A' and 'B' in FIG. 17A) and to roll axis control 304 and yaw axis control 306 (data paths labeled 'C' and 'D' in FIG. 17A).

Pitch Axis Control

Figure 17B:
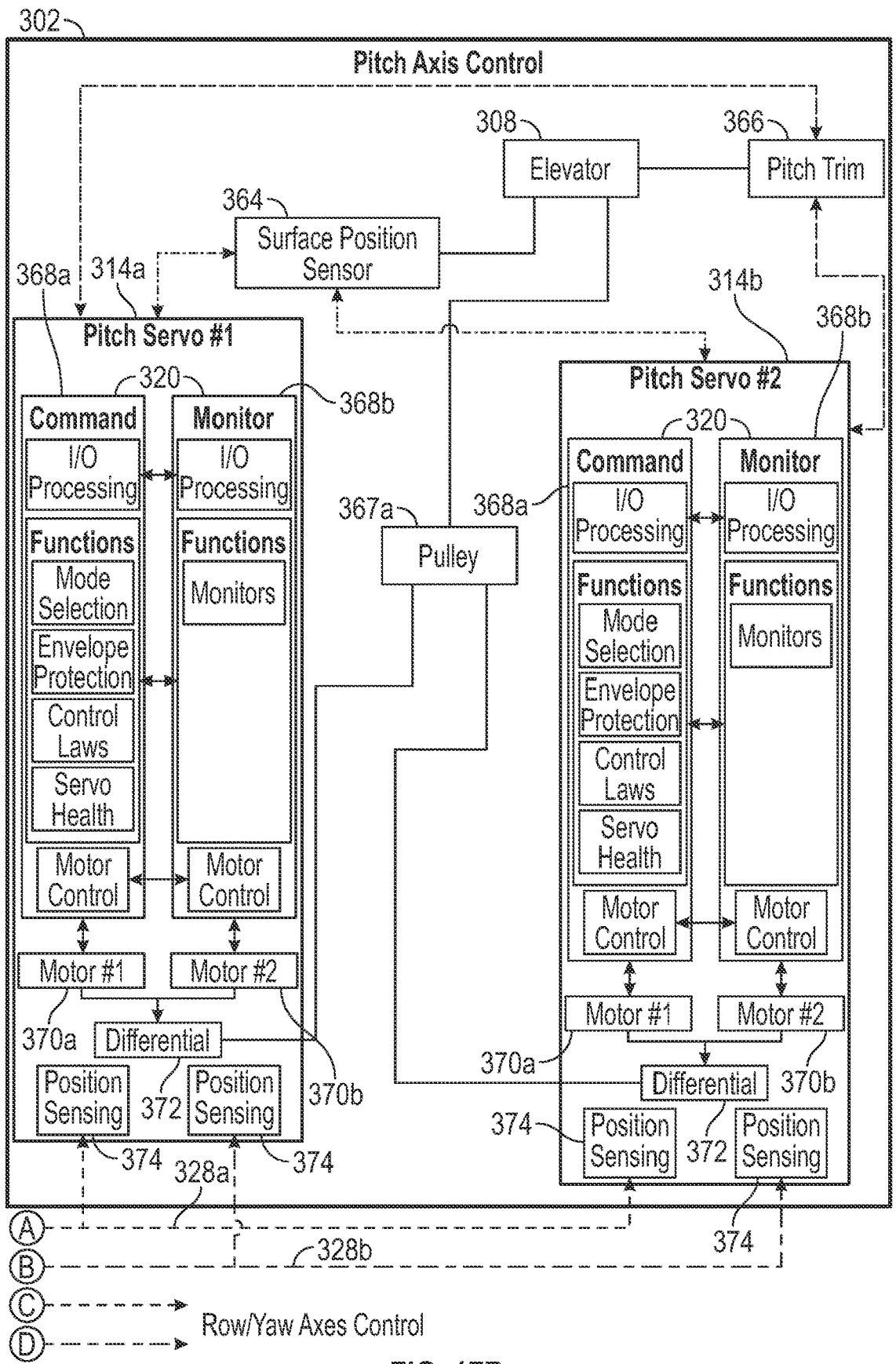
FIG. 17B illustrates a block diagram of a pitch axis control of the FBW system for some embodiments.

Turning now to FIG. 17B, pitch axis control 302 is illustrated in further detail in accordance with aspects of the present disclosure. Along with servos 314a, 314b, pitch axis control 302 may comprise, at least one position sensor 364, and a pitch trim 366. As discussed, secondary pitch servo 314b may be a redundant servo configured to operate in the event of a failure in the primary pitch servo 314a. In example configurations, three types of installations may be provided: (1) A primary and redundant servo installed on each axis (e.g. 2 servos connected to both elevators, only one controlling at a giving moment in time), (2) Dual primary servos installed on each control surface or axis (e.g. 2 servos connected to one or more surfaces, both controlling at the same time for higher rate of motion or force/torque), and (3) Two primary servos, each connected to a single surface (e.g. 1 servo connected to left elevator and 1 servo connected to right elevator).

Servos 314a, 314b may control the position of elevator 308 and position sensor 364 may detect the position of elevator 308 and provide the positional information as feedback to the FCCs 320 on servos 314a, 314b to make any necessary adjustments to the actuator output. In some embodiments, the position sensor 364 is linear variable differential transform (LVDT) or a rotary variable differential transformer (RVDT), or may include both an LVDT and an RVDT. In some embodiments, a pulley system 367a is used to control the position of elevator 308, and servos 314a, 314b may be drive pulley wheels.

In some embodiments, primary pitch servo 314a is coupled to a first elevator 308 (e.g., a right elevator), and secondary pitch servo 314b is coupled to a second elevator 308 (e.g., a left elevator). In some embodiments, a position sensor 364 is provided for each independent control surface. Thus, in the above example, there may be a first position sensor 364 for the right elevator and a second position sensor 364 for the left elevator In one example, each servo FCC 320 may comprise a command-monitor architecture comprising a command processing lane 368a communicatively coupled to a monitor processing lane 368b, which respectively control a first motor 370a and a second motor 370b. During normal operation command processing lane 368a may control the output of a servo 314a, 314b, while monitor processing lane 368b monitors the output to ensure command processing lane 368a is performing correctly. If monitor processing lane 368b detects an error in command processing lane 368a, monitor processing lane 368b may assume operations of the servo 314a, 314b. In some embodiments, monitor processing lane 368b performs the same calculations as command processing lane 368a to determine an output of the servo 314a, 314b, and compares this output to its own output. If there is a significant difference (e.g., a difference greater than a threshold value, such as 10%), monitor processing lane 368b may determine command processing lane 368a to be performing incorrectly and assume control of operations of servo 314a.

In some examples, command processing lane 368a is a physically discrete computer from monitor processing lane 368b. In some embodiments, lanes 368a, 368b are embodied as one or more microprocessors and associated memory, which may store computer-executable instructions executable by the one or more microprocessor to carry out the operation of the servo actuator. While each servo 314a, 314b may comprise a substantially similar command-monitor computing architecture, the lanes 368a, 368b on primary pitch servo 314a may comprise hardware distinct from the corresponding lanes 368a, 368b on redundant pitch servo 314b. By configuring lanes 368a, 368b with dissimilar hardware on primary pitch servo 314a as compared to lanes 368a, 368b on secondary pitch servo 314b, the software on each servo 314a, 314b may need to be compiled differently, which can mitigate common mode errors on servos 314a, 314b. The hardware may be distinct by being sourced from different manufacturers, for example. Additionally, on each servo 314a, 314b, the command processing lane 368a may utilize software dissimilar from the monitor processing lane 368b but both lanes 368a, 368b may be programmed according to a set of common functional requirements (e.g., control laws) such that each lane 368a, 368b should produce the same output with a given input. For example, the software may be dissimilar by being developed by independent software teams, written in different programming languages, or the like. By utilizing dissimilar software to achieve the same functions, common software-level errors for servos 314a, 314b can be avoided. Servo FCCs may include any or all of the components illustrated with respect to FIG. 19.

In some embodiments, each lane 368a, 368b is configured to perform at least one of: mode selection, envelope protection, control law calculations, and servo health monitoring. The mode selection may be based on the flight control law the aircraft is operating in. For example, when operating under normal law, the mode selection may be between ground mode or flight mode. It will be appreciated the modes may vary based on the overall flight control system philosophy, which may vary by manufacturer. The flight envelope protection may limit the pitch and roll of the aircraft if the pilot inputs a change that would cause the aircraft to pitch or roll outside the envelope as will be appreciated by one of skill in the art. Additionally, the FCC 320 may be configured to monitor servo health and to cause corrective actions to be taken if the servo health indicates aberrational or otherwise unsafe performance. For example, the monitor processing lane 368b may monitor the health (i.e., performance) of the respective command lane 368a and overtake operations if the performance is aberrational. The lanes 368a, 368b may be programmed with other functionality as will be appreciated by one of skill in the art. As previously discussed, servo FCC may include any or all of the functionality of the primary FCC (e.g., computer 332).

As previously discussed, command processing lane 368a is configured to control a first motor 370a and monitor processing lane 368b is configured to control a second motor 370b. Second motor 370b may only be used when monitor processing lane 368b assumes command of servo output, such as due to an error in command processing lane 368a. Motor 370a, 370b may be coupled to a differential 372 (which may correspond to a differential 112a, 112b described above). In some embodiments, first motor 370a is coupled to a first side of differential 372 and second motor 370b is coupled to a second side of differential 372. By coupling the motor 370a, 370b to distinct sides of differential 372, each motor 370a, 370b can act as a motor, clutch, or brake on the output of the servo 314a, 314b. Servos 314a, 314b may additionally comprise position sensors 374 (e.g., an encoder). In some embodiments, one, two, or more position sensors 374 are provided to monitor the position of each servo 314a, 314b, which may be used in the feedback loop to adjust the output of the servo 314a, 314b.

Pitch axis control 302 may further comprise pitch trim 366, which may be communicatively coupled to each servo 314a, 314b and to at least one position sensor 364. In some embodiments, pitch trim 366 is not communicatively coupled to position sensor 364. In some embodiments, the pitch trim 366 may have at least one dedicated (e.g., integral) position sensor for monitoring its position and/or for communicating a position of elevator 308 to pitch trim 366. Pitch trim 366 may be a servo to trim the elevator 308 to reduce the load on the operating servo 314a, 314b during flight. Data from pitch trim 366 may be communicated to servos 314a, 314b and processed by FCC 320 as part of the feedback loop for controlling the output of the servos 314a, 314b to set the position of elevator 308 based on the desired position.

Roll Axis Control

Figure 17C:
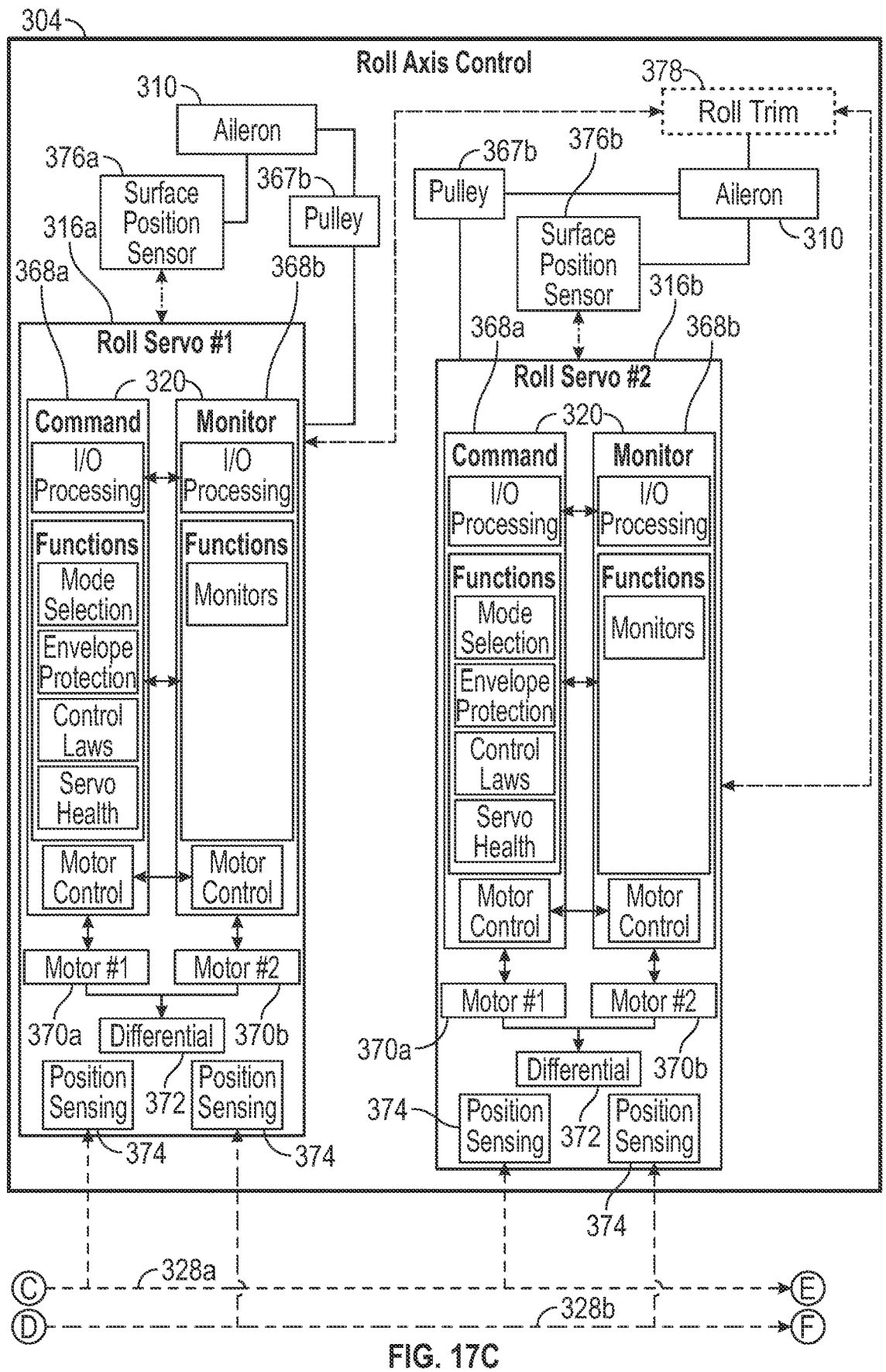
FIG. 17C illustrates a block diagram of a roll axis control of the FBW system for some embodiments.

Turning now to FIG. 17C, roll axis control 304 is illustrated in further detail in accordance with aspects of the present disclosure. Roll axis control 304 may be substantially similar to pitch axis control 302. Roll axis control 304 may comprise a primary roll servo 316a and a secondary roll servo 316b, which may be substantially similar to pitch servos 314a, 314b. More specifically, each servo 316a, 316b may comprise a servo FCC 320 configured with processing lanes 368a, 368b that drive distinct motors 370a, 370b coupled to distinct sides of a differential 372 to adjust the position of the aileron 310. Data from buses 328a, 328b may be communicated to roll axis control 304 as shown.

Servos 316a, 316b may actuate a pulley system 367b to adjust the position of aileron 310. Similarly, the processing lanes 368a, 368b on primary roll servo 316a may be configured with different hardware than the processing lanes 368a, 368b on secondary roll servo 316a. Each servo 316a, 316b may comprise one, two, or more position sensors 374. One or more position sensors 376a, 376b may be provided for each independent aileron control surface actuated by a servo 316a, 316b. For example, and as illustrated, the primary roll servo 316a is coupled to a first pulley wheel of pulley system 367b, and redundant roll servo 316b is coupled to a second pulley wheel of pulley system 367b for adjusting the position of aileron 310. Accordingly, a first position sensor 376a may be provided for monitoring the position of the first pulley wheel, and a second position sensor 376b may be provided for monitoring the position of the second pulley wheel. In embodiments where each roll servo 316a, 316b drives the same control surface, a single position sensor may be provided. In some embodiments, position sensors 376a, 376b are a LVDT, an RVDT, or a single LVDT/RVDT.

Roll axis control 304 may additionally comprise roll trim 378 for maintaining the roll trim. As with pitch trim 366, roll trim 378 may be a servo configured to trim the aileron 310. In some embodiments, roll trim 378 is controlled by a servo FCC 320 on servo 316a, 316b or by the primary FCC. Roll trim 378 may be communicatively coupled to and provide data to servos 316a, 316b and position sensors 376a, 376b, which may be used to adjust the operations thereof. Roll trim 378 may be utilized when the aircraft is operating in autopilot. Roll trim 378 may be configured to reduce the load on the operating servo 316a, 316b in all flight conditions. In some embodiments, roll trim 378 is included in embodiments where FBW system 252 is a multi-engine aircraft.

Yaw Axis Control

Figure 17D:
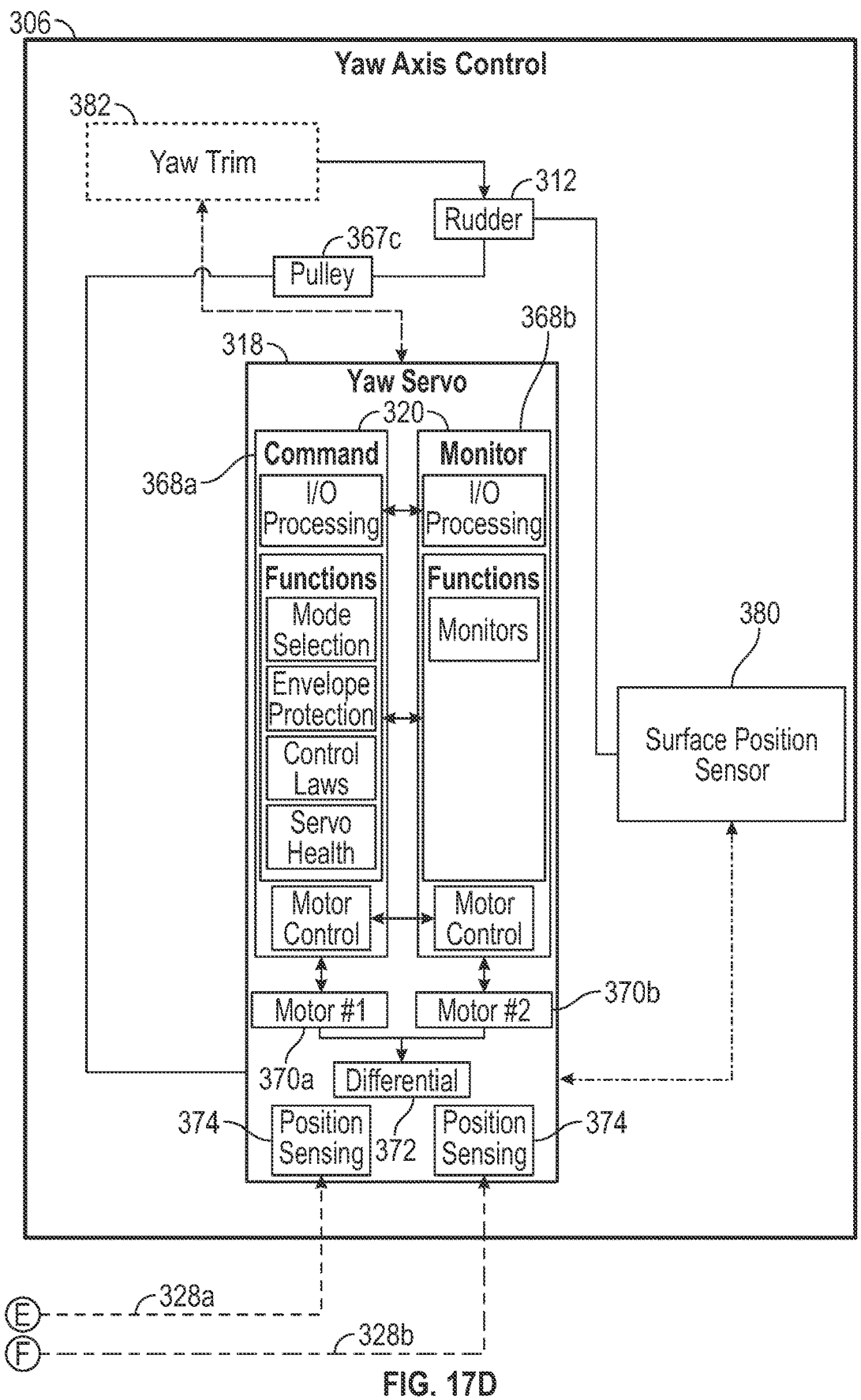
FIG. 17D illustrates a block diagram of a yaw axis control of the FBW system for some embodiments.

Turning now to FIG. 17D, yaw axis control 306 is illustrated in further detail in accordance with aspects of the present disclosure. As previously discussed, yaw axis control 306 may comprise a single servo 318; however, in some embodiments a secondary/redundant servo substantially similar to redundant servos 314b, 316b may be provided.

Yaw servo 318 may be substantially similar to primary servos 314a, 316a previously discussed. More specifically, yaw servo 318 may comprise a servo FCC 320 configured with processing lanes 368a, 368b that drive distinct motors 370a, 370b coupled to distinct sides of a differential 372 to adjust the position of the rudder 312. Servo 318 may actuate a pulley system 367c to adjust the position rudder 312. Servo 318 may comprise one, two, or more position sensors 380. A yaw position sensor 380 may be provided for monitoring the position of rudder 312 and providing the positional information to FCC 320 on yaw servo 318. In some embodiments, yaw position sensor 380 is a LVDT, an RVDT, or a dual LVDT/RVDT.

Yaw axis control 306 may further comprise yaw trim 382 for trimming the yaw and alleviating the workload of yaw servo 318. Yaw trim 382 may be communicatively coupled to yaw servo 318 and to yaw position sensor 380 to such that data from yaw trim 382 is fed back to yaw servo 318 for processing by servo FCC 320. Yaw trim 382 may likewise be a servo for trimming the rudder 312. In some embodiments, yaw trim 382 is included in embodiments where FBW system 252 is a multi-engine aircraft.

Exemplary Operational Method

Figure 18:
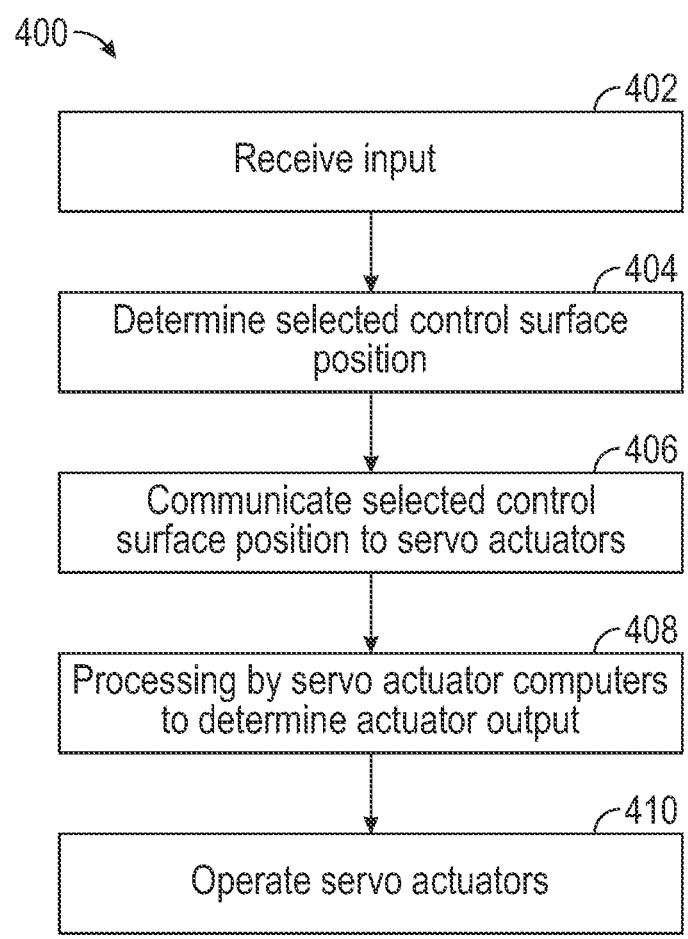
FIG. 18 illustrates an exemplary method in accordance for some embodiments.

Turning now to FIG. 18, an operational method 400 for adjusting one or more control surfaces using FBW system 300 is illustrated in accordance with embodiments of the present disclosure. Method 400 may begin at step 402 where input may be received. Pilot input may be received via flight control devices 322, which may include sidesticks 324 and/or rudder pedals 326, or any other flight control device, such as a yoke (also known as a control wheel or control column), a throttle input (e.g., wheel, knob, or lever), at trim wheel, or the like. In some embodiments, the input is from an autopilot system requesting a change in a position of a control surface.

Next, at step 404, the selected position of the control surface may be determined. Where input is received via a flight control device 322, determining the selected position may comprise sensor voting between sensors 350a, 350b for changes to the elevator 308 and/or the aileron 310, or between sensors 360a, 360b for changes to the rudder 312. If a failure event occurs, a processing channel (e.g., a processing channel 352a, 352b for pitch/roll input or a processing channel 362a, 362b for rudder input) may control the selection of the desired position. It will be appreciated that the determination of a selected position may vary based on the operating mode of the aircraft, and that other methods of determining a selected position are within the scope hereof.

Once the desired position is determined, at step 406, the desired position may be communicated to pitch axis control 302, roll axis control 304, yaw axis control 306, avionics 330, or any combination thereof. The communication may be via data buses 328a, 328b or via any other communication channel, such as any wired or wireless communication method. As previously discussed, pitch axis control 302 and roll axis control 304 may each comprise primary servos 314a, 316a and redundant servos 314b, 316b, each of which may be coupled to a data bus 328a, 328b. The desired position may be communicated to avionics 330 for processing thereby, such as to monitor the output of any or all of axis controls 302, 304, 306.

At step 408, the servo FCC 320 on each servo 314a, 314b, 316a, 316b, 318, may process the positional data according to the control laws programmed into the servo FCC 320. As discussed, each servo FCC 320 may be configured with a command-monitor architecture, where each processing lane controls a respective motor coupled to a respective side of a differential for controlling the output of the respective servo. The command-monitor architecture provides redundancy.

Lastly, at step 410, the servo(s) may be operated to achieve the desired position. Each servo may receive feedback data from control surface position sensors 364, 376a, 376b, 380 that provide position data for the respective control surface being adjusted. Additionally, new input from the pilot may be received and transmitted to one or more servos, which may also cause an adjustment to the operation of the servo as will be appreciated by one of skill in the art.

Exemplary Hardware Platform

Figure 19:
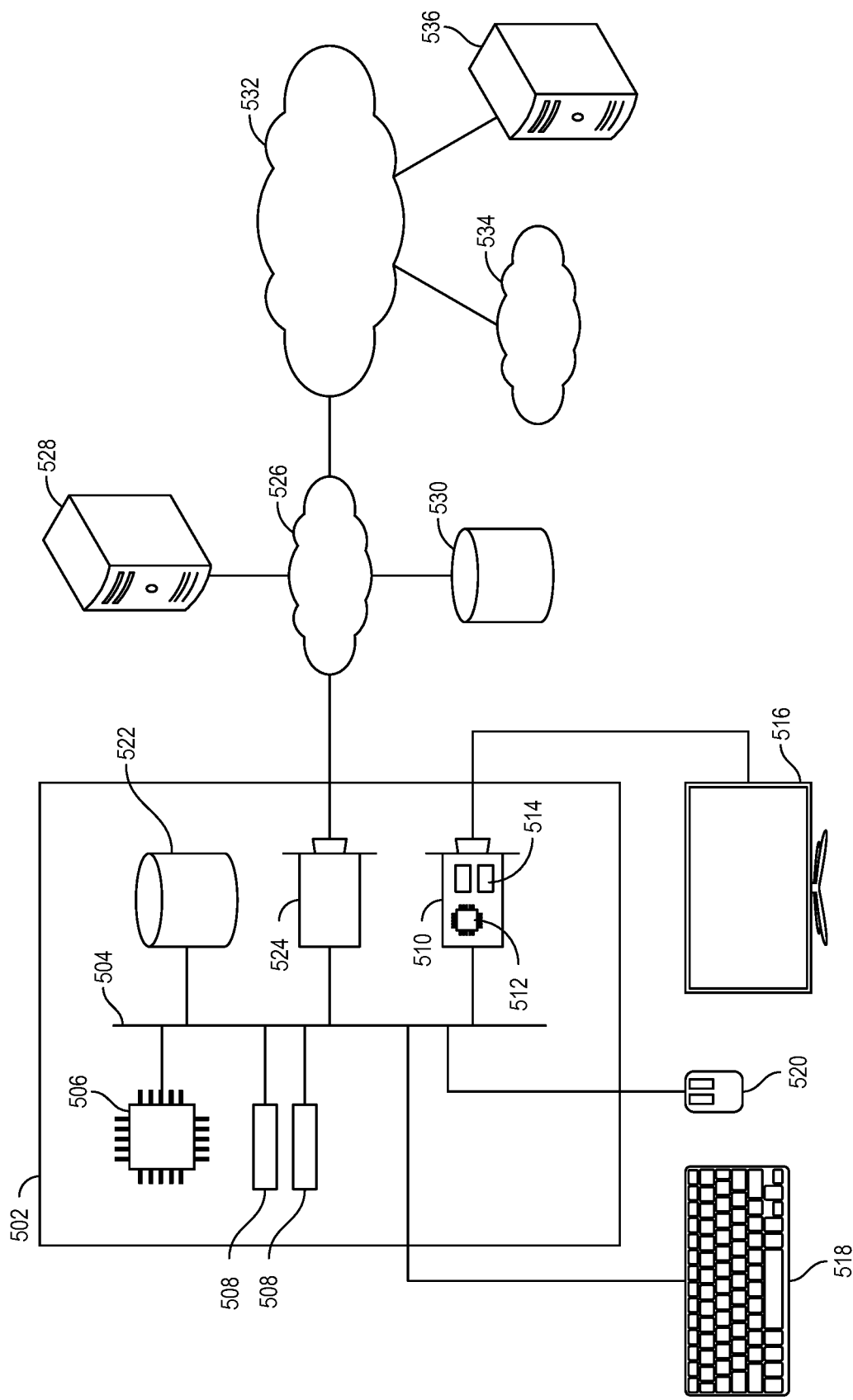
FIG. 19 illustrates an exemplary hardware platform for some embodiments.

In FIG. 19, an exemplary hardware platform for certain embodiments is depicted. Computer 502 can be a desktop computer, a laptop computer, a server computer, a mobile device such as a smartphone or tablet, or any other form factor of general- or special-purpose computing device. Depicted with computer 502 are several components for illustrative purposes. In some embodiments, certain components may be arranged differently or absent. Additional components may also be present. Included in computer 502 is system bus 504, whereby other components of computer 502 can communicate with each other. In certain embodiments, there may be multiple buses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card but rather may be integrated into the motherboard or the CPU 506. In some embodiments, graphics card 510 has a separate graphics-processing unit (GPU) 512, which can be used for graphics processing or for general-purpose computing (GPGPU). Also on graphics card 510 is GPU memory 514. Connected (directly or indirectly) to graphics card 510 is display 516 for user interaction. In some embodiments, no display is present, while in others, it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media and may be internally installed in computer 502 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical but transitory forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 524 is also attached to system bus 504 and allows computer 502 to communicate over a network such as local network 526. NIC 524 can be any form of network interface known in the art, such as Ethernet, ATM, fiber, Bluetooth, or Wi-Fi (i.e., the IEEE 602.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write, and seek operations, or any level of complexity in between. Some data stores may additionally provide management functions for data sets stored therein, such as backup or versioning. Data stores can be local to a single computer such as computer 528, accessible on a local network such as local network 526, or remotely accessible over Internet 532. Local network 526 is, in turn, connected to Internet 532, which connects many networks such as local network 526, remote network 534, or directly attached computers such as computer 536. In some embodiments, computer 502 can itself be directly connected to Internet 532.

Although current disclosure has been described with reference to the embodiments illustrated in the attached drawing figures, it is noted that equivalents may be employed, and substitutions made herein without departing from the scope of the disclosure as recited in the claims.

Having thus described various embodiments, what is claimed as new and desired to be protected by Letters Patent includes the following.

The invention claimed is:

1. A fly-by-wire system, comprising:
an input system for receiving input from a pilot; and
a control system communicatively coupled to the input system, the control system comprising:
   a pitch axis control comprising a primary pitch servo actuator and a secondary pitch servo actuator, wherein the primary pitch servo actuator and secondary pitch servo actuator are each coupled to at least one control surface that, when adjusted, controls a pitch axis position; and
   a roll axis control comprising a primary roll servo actuator and a secondary roll servo actuator, wherein the primary roll servo actuator and secondary roll servo actuator are each coupled to at least one control surface that, when adjusted, controls the roll axis position;
   wherein each of the primary pitch servo actuator, the secondary pitch servo actuator, the primary roll servo actuator, and the secondary roll servo actuator comprises a flight control computer (FCC) configured to adjust the at least one control surface to which the respective servo actuator is coupled based on the input from the input system and feedback from the corresponding control surface;
   wherein the FCC on each of the primary pitch servo actuator and the secondary pitch servo actuator controls only pitch axis positioning and the FCC on each of the primary roll servo actuator and the secondary roll servo actuator controls only roll axis positioning.

2. The fly-by-wire system of claim 1, wherein each FCC comprises a command-monitor computing architecture having a command processing lane and a monitor processing lane, the command processing lane and the monitor processing lane distinctly programmed based on flight control laws.

3. The fly-by-wire system of claim 2, wherein each servo actuator comprises a first motor coupled to a first side of a differential and a second motor coupled to a second side of the differential.

4. The fly-by-wire system of claim 3, wherein the command processing lane controls the first motor, and the monitor processing lane controls the second motor.

5. The fly-by-wire system of claim 1, wherein the secondary pitch servo actuator is configured to position the at least one control surface to which it is coupled in response to a detected failure in the primary pitch servo actuator.

6. The fly-by-wire system of claim 5,
wherein the control surface to which the primary pitch servo actuator is coupled is a first elevator and the control surface to which the secondary pitch servo actuator is coupled is a second elevator.

7. The fly-by-wire system of claim 1, wherein the FCC on the primary pitch servo actuator comprises hardware distinct from hardware on the FCC on the secondary pitch servo actuator.

8. A control system for aircraft, comprising:
an input system, comprising:
   at least one flight control device comprising at least one sensor configured to provide a pitch axis command and a roll axis command based on a first input received from a pilot;
   a rudder pedal interface comprising at least one yaw axis sensor for providing a desired yaw axis command based on a second input received from the pilot;
a pitch servo actuator coupled to a first control surface that, when adjusted, controls a pitch axis position, wherein the pitch servo actuator comprises a pitch axis flight control computer (FCC) configured to:
   receive first positional data from the at least one sensor indicative of the pitch axis command; and
   adjust the first control surface to obtain the desired pitch axis position;
a roll servo actuator coupled to a second control surface that, when adjusted, controls a roll axis position, wherein the roll servo actuator comprises a roll axis FCC configured to:
   receive second positional data from the at least one sensor indicative of the roll axis command; and
   adjust the second control surface to obtain the desired roll axis position; and
a yaw servo actuator coupled to a third control surface that, when adjusted, controls a yaw axis position, wherein the yaw servo actuator comprises a yaw axis FCC configured to:
   receive third positional data from the at least one yaw axis sensor indicative of the yaw axis command; and
   adjust the third control surface to obtain the desired yaw axis position;

wherein the pitch axis FCC controls only pitch axis positioning, the roll axis FCC controls only roll axis positioning, and the yaw axis FCC controls only yaw axis positioning.

9. A fly-by-wire system, comprising:

at least one input; and a control system communicatively coupled to the at least one input, comprising:

at least one pitch servo actuator comprising a pitch axis flight control computer (FCC) for adjusting an elevator based on input from the at least one input; and at least one roll servo actuator comprising a roll axis FCC for adjusting an aileron based on input from the at least one input; and a yaw servo actuator comprising a yaw axis FCC for adjusting a rudder based on input from the at least one input, wherein the pitch axis FCC controls only adjustment of the elevator, the roll axis FCC controls only adjustment of the aileron, and the yaw axis FCC controls only adjustment of the rudder.

10. The fly-by-wire system of claim 9, wherein each of the at least one pitch servo actuator, the at least one roll servo actuator, and the yaw servo actuator comprises a first motor and a second motor, wherein the first motor and the second motor are coupled to respective sides of a differential for controlling a control surface.

11. The fly-by-wire system of claim 10, wherein the differential is a harmonic drive differential.

12. The fly-by-wire system of claim 9, wherein the at least one input comprises pilot input received via at least one flight control device or input from an autopilot system.

13. The fly-by-wire system of claim 12, wherein the at least one flight control device comprises a first sidestick and a second sidestick, and wherein the first sidestick and the second sidestick are mechanically coupled.

14. The fly-by-wire system of claim 9, wherein at least one of: the at least one pitch servo actuator, the at least one roll servo actuator, or the yaw servo actuator comprises at least one position sensor for monitoring a position thereof.

* * * * *